United States Patent
Xie

(10) Patent No.: US 11,762,881 B2
(45) Date of Patent: Sep. 19, 2023

(54) PARTITION MERGING METHOD AND DATABASE SERVER

(71) Applicant: Huawei Cloud Computing Technologies, Co., Ltd., Guizhou (CN)

(72) Inventor: Xiaoqin Xie, Beijing (CN)

(73) Assignee: HUAWEI CLOUD COMPUTING TECHNOLOGIES CO., LTD., Guizhou (CN)

(*) Notice: Subject to any disclaimer, the term of this patent is extended or adjusted under 35 U.S.C. 154(b) by 28 days.

(21) Appl. No.: 17/171,706

(22) Filed: Feb. 9, 2021

(65) Prior Publication Data

US 2021/0165805 A1    Jun. 3, 2021

Related U.S. Application Data

(63) Continuation of application No. PCT/CN2019/097559, filed on Jul. 24, 2019.

(30) Foreign Application Priority Data

Aug. 14, 2018 (CN) .......................... 201810919475.9
Sep. 29, 2018 (CN) .......................... 201811147298.3

(51) Int. Cl.
*G06F 16/27* (2019.01)
*G06F 16/22* (2019.01)
*G06F 16/23* (2019.01)

(52) U.S. Cl.
CPC ........ *G06F 16/278* (2019.01); *G06F 16/2282* (2019.01); *G06F 16/2358* (2019.01)

(58) Field of Classification Search
CPC ............. G06F 16/2272; G06F 16/2282; G06F 16/278; G06F 16/2358
See application file for complete search history.

(56) References Cited

U.S. PATENT DOCUMENTS

| | | | |
|---|---|---|---|
| 2012/0072656 A1 | 3/2012 | Archak et al. | |
| 2012/0109892 A1 | 5/2012 | Novik et al. | |
| 2012/0109926 A1 | 5/2012 | Novik et al. | |
| 2014/0280375 A1* | 9/2014 | Rawson ................. | G06F 16/21 |
| | | | 707/803 |
| 2015/0347401 A1 | 12/2015 | Raghavan et al. | |
| 2016/0092541 A1 | 3/2016 | Liu et al. | |
| 2017/0193041 A1 | 7/2017 | Fuchs | |
| 2017/0212680 A1* | 7/2017 | Waghulde ............. | G06F 3/0644 |

(Continued)

FOREIGN PATENT DOCUMENTS

| | | |
|---|---|---|
| CN | 102521234 A | 6/2012 |
| CN | 103473321 A | 12/2013 |

(Continued)

OTHER PUBLICATIONS

Jiaheng, C., et al., "The Spatial Join Strategy and Algorithm of Object Manage," Wuhan Univ. (Natural Science Edition), vol. 44, No. 5, 1998, with an English abstract, 4 pages.

(Continued)

*Primary Examiner* — James E Richardson

(74) *Attorney, Agent, or Firm* — Conley Rose, P.C.

(57) ABSTRACT

A partition merging method includes obtaining, by a first database server, first metadata of a first partition based on an identifier of a current file of the first partition, obtaining second metadata of a second partition based on an identifier of a current file of the second partition, and generating third metadata of a third partition based on the first metadata and the second metadata.

18 Claims, 8 Drawing Sheets

(56) References Cited

U.S. PATENT DOCUMENTS

| | | | |
|---|---|---|---|
| 2018/0039671 A1 | 2/2018 | Yang et al. | |
| 2018/0307425 A1* | 10/2018 | Blount | G06F 3/0631 |
| 2019/0007206 A1* | 1/2019 | Surla | H04L 63/10 |
| 2020/0117728 A1* | 4/2020 | Tomlinson | G06F 16/2246 |
| 2020/0183905 A1* | 6/2020 | Wang | G06F 16/2246 |
| 2022/0156231 A1* | 5/2022 | Wang | G06F 11/1484 |

FOREIGN PATENT DOCUMENTS

| | | | |
|---|---|---|---|
| CN | 103593436 A | 2/2014 | |
| CN | 104765794 A | 7/2015 | |
| CN | 105095287 A | 11/2015 | |
| CN | 105872098 A | 8/2016 | |
| CN | 106156168 A | 11/2016 | |
| CN | 106844650 A | 6/2017 | |
| CN | 107689977 A | 2/2018 | |
| CN | 107943412 A | 4/2018 | |
| CN | 108959510 A | 12/2018 | |

OTHER PUBLICATIONS

Yue-Ming, S., et al., "A Consistent Hashing Load Balancing Strategy Based on Fragmentation and Its Application," Computer Technology and Development, vol. 27, No. 11, with an English abstract, 5 pages.

Zhang, Q., et al., "Research on High Efficient Data Mining Algorithm under the Distributed Environment," Mar. 2017, 61 pages.

He, A., "SSTable compaction and compaction strategies", Oct. 26, 2016, XP055822271, 12 Pages.

\* cited by examiner

PARTITION MERGING METHOD AND DATABASE SERVER

CROSS-REFERENCE TO RELATED APPLICATIONS

This application is a continuation of International Patent Application No. PCT/CN2019/097559 filed on Jul. 24, 2019, which claims priority to Chinese Patent Application No. 201810919475.9 filed on Aug. 14, 2018 and Chinese Patent Application No. 201811147298.3 filed on Sep. 29, 2018. All of the aforementioned patent applications are hereby incorporated by reference in their entireties.

TECHNICAL FIELD

This application relates to the field of information technologies, and in particular, to a partition merging method and a database server.

BACKGROUND

In a distributed database system such as a key-value database (KVDB), to adapt to a requirement of an increasing quantity of data entries, data entries in a data table are usually managed using a partition. A database server provides a service such as storage management for each partition. A homing relationship between a partition and a database server is dynamically specified by a management server in the distributed database system.

In the distributed database system, it is required that load balancing can be dynamically performed based on a cluster scale, load, or another policy. Therefore, in some cases, two adjacent partitions need to be merged into a new partition.

Currently, in a solution of merging adjacent partitions, data entries in one of the partitions need to be read by traversal, and then written into the other partition. A partition usually stores a large quantity of data entries. As a result, a large quantity of data entries is read and written during partition merging, and overheads are greatly increased.

SUMMARY

This application provides a partition merging method and a database server, to reduce data read/write operations.

According to a first aspect, an embodiment of this application provides a partition merging method in a distributed database system, where the distributed database system includes a first database server, a second database server, and a management server, the first database server runs a first partition, the second database server runs a second partition, and the method includes receiving, by the first database server, a merging instruction sent by the management server, where the merging instruction is used to merge the first partition and the second partition into a third partition, the first partition and the second partition are adjacent partitions, the merging instruction includes an identifier of a current file of the first partition and an identifier of a current file of the second partition, the current file of the first partition records a file identifier of a file that stores metadata of the first partition, and the current file of the second partition records a file identifier of a file that stores metadata of the second partition, obtaining, by the first database server, the metadata of the first partition based on the identifier of the current file of the first partition, obtaining, by the first database server, the metadata of the second partition based on the identifier of the current file of the second partition, and merging, by the first database server, the metadata of the first partition and the metadata of the second partition, to generate metadata of the third partition. In the foregoing technical solution, the first partition and the second partition may be directly merged into the third partition based on the metadata of the first partition and the metadata of the second partition, and data in the first partition and the second partition does not need to read, by traversal, out to the partition obtained by merging. In this way, data read/write operations can be reduced, and a partition merging speed can be improved. In addition, in a process of merging two partitions, service write operations on the two partitions are temporarily frozen until partition merging is completed. In this embodiment of this application, a time of freezing the service write operations on the partitions is also reduced. Optionally, load of the first database server is lighter than load of the second database server. In this embodiment of this application, the first partition and the second partition are merged into the third partition using a method of merging the metadata of the first partition and the metadata of the second partition into the metadata of the third partition. To be specific, the metadata of the third partition is accessed to access data entries in the first partition and data entries in the second partition. That is, the metadata of the third partition is generated by merging the metadata of the first partition and the metadata of the second partition. The metadata of the third partition corresponds to the data entries in the first partition and the data entries in the second partition, and the data entries in the first partition and the data entries in the second partition serve as data entries in the third partition.

With reference to the first aspect, in a possible implementation of the first aspect, the metadata of the first partition includes data storage unit information of a secondary column family of the first partition, and the metadata of the second partition includes data storage unit information of a secondary column family of the second partition, and merging, by the first database server, the metadata of the first partition and the metadata of the second partition, to generate metadata of the third partition includes merging, by the first database server, the data storage unit information of the secondary column family of the first partition and the data storage unit information of the secondary column family of the second partition, to generate data storage unit information of a target secondary column family, and determining data storage unit information of a secondary column family of the third partition based on the data storage unit information of the target secondary column family. In the foregoing technical solution, during merging of the first partition and the second partition, only the data storage unit information of the secondary column family of the first partition and the data storage unit information of the secondary column family of the second partition may be merged, and a data entry stored in a corresponding data storage unit does not need to be copied (or referred to as read and write). In this way, the data read/write operations can be reduced, and this reduces a time for which a partition is frozen, improves partition merging efficiency, and reduces service write congestion. Optionally, the distributed database system is a database system that uses a log-structured merge-tree (LSM-tree) algorithm, data storage unit information is sorted string table (SSTable) information, a data storage unit is an SSTable, and both the file that stores the metadata of the first partition and the file that stores the metadata of the second partition are manifest files.

With reference to the first aspect, in a possible implementation of the first aspect, the first database server creates a current file for the third partition, where the current file of the third partition records a file identifier of a file that stores the metadata of the third partition.

With reference to the first aspect, in a possible implementation of the first aspect, the data storage unit information of the secondary column family of the first partition includes $P_1$ levels of data storage unit information, where $P_1$ is a positive integer greater than or equal to 2, the data storage unit information of the secondary column family of the second partition includes $P_2$ levels of data storage unit information, where $P_2$ is a positive integer greater than or equal to 2, the data storage unit information of the target secondary column family includes Q levels of data storage unit information, and the Q levels of data storage unit information include the data storage unit information of the secondary column family of the first partition and the data storage unit information of the secondary column family of the second partition, a level of data storage unit information in the Q levels of data storage unit information includes a level of data storage unit information in the $P_1$ levels of data storage unit information included in the data storage unit information of the secondary column family of the first partition and a level of data storage unit information in the $P_2$ levels of data storage unit information included in the data storage unit information of the secondary column family of the second partition, and a level of data storage unit information in (Q−1) levels of data storage unit information in the Q levels of data storage unit information includes a level of data storage unit information in the $P_1$ levels of data storage unit information included in the data storage unit information of the secondary column family of the first partition or a level of data storage unit information in the $P_2$ levels of data storage unit information included in the data storage unit information of the secondary column family of the second partition, where Q is equal to $P_1+P_2-1$.

With reference to the first aspect, in a possible implementation of the first aspect, level 0 data storage unit information in the Q levels of data storage unit information includes level 0 data storage unit information in the data storage unit information of the secondary column family of the first partition and level 0 data storage unit information in the data storage unit information of the secondary column family of the second partition, and level (2×q−1) data storage unit information in the Q levels of data storage unit information includes level q data storage unit information in P levels of data storage unit information in the $P_1$ levels of data storage unit information included in the data storage unit information of the secondary column family of the first partition, and level (2×q) data storage unit information in the Q levels of data unit storage information includes level q data storage unit information in P levels of data storage unit information in the $P_2$ levels of data storage unit information included in the data storage unit information of the secondary column family of the second partition, where q=1, . . . , P−1, and a value of P is a value obtained by subtracting 1 from a minimum value in $P_1$ and $P_2$.

With reference to the first aspect, in a possible implementation of the first aspect, level 0 data storage unit information in the Q levels of data storage unit information includes level 0 data storage unit information in the data storage unit information of the secondary column family of the first partition and level 0 data storage unit information in the data storage unit information of the secondary column family of the second partition, level 1 data storage unit information to level (P−1) data storage unit information in the Q levels of data storage unit information are respectively level 1 data storage unit information to level (P−1) data storage unit information in P levels of data storage unit information in the $P_1$ levels of data storage unit information included in the data storage unit information of the secondary column family of the first partition, and level P data storage unit information to level (Q−1) data storage unit information in the Q levels of data storage unit information are respectively level 1 data storage unit information to level (P−1) data storage unit information in P levels of data storage unit information in the $P_2$ levels of data storage unit information included in the data storage unit information of the secondary column family of the second partition, where a value of P is a value obtained by subtracting 1 from a minimum value in $P_1$ and $P_2$.

With reference to the first aspect, in a possible implementation of the first aspect, the method further includes determining, by the first database server, the data storage unit information of the secondary column family of the third partition based on the data storage unit information of the target secondary column family, where the data storage unit information of the secondary column family of the third partition includes P levels of data storage unit information, level 1 data storage unit information in the P levels of data unit storage information in the data storage unit information of the secondary column family of the third partition is data storage unit information of a data storage unit that is obtained after data storage units corresponding to the level 0 data storage unit information in the Q levels of data storage unit information are merged and resorted, and each of level 2 to level (P−1) data storage unit information in the P levels of data unit storage information in the data storage unit information of the secondary column family of the third partition is data storage unit information of a data storage unit that is obtained after data storage units corresponding to at least two levels of data storage unit information in level 1 data storage unit information to level (Q−1) data storage unit information in the Q levels of data storage unit information are merged and resorted. In the foregoing technical solution, during merging of the first partition and the second partition, only a merged and resorted data storage unit needs to be read and written. In this way, the data read/write operations are few, and this reduces a time for which a partition is frozen, improves the partition merging efficiency, and reduces service write congestion. Further, in the foregoing technical solution, a quantity of levels of data storage unit information in the third partition may be reduced, to facilitate subsequent operations such as data searching in the third partition.

With reference to the first aspect, in a possible implementation of the first aspect, a prefix of an entry key value in each piece of data storage unit information in the data storage unit information of the secondary column family is a non-partition key value.

With reference to the first aspect, in a possible implementation of the first aspect, the metadata of the first partition includes the data storage unit information of the secondary column family of the first partition, and the metadata of the second partition includes the data storage unit information of the secondary column family of the second partition, and merging, by the first database server, the metadata of the first partition and the metadata of the second partition, to generate metadata of the third partition includes merging, by the first database server, the data storage unit information of the secondary column family of the first partition and the data storage unit information of the secondary column family of the second partition, to generate the data storage unit information of the secondary column family of the third partition. Further, for a manner of generating the data storage unit information of the secondary column family of the third partition, refer to the manner of generating the data storage unit information of the target secondary column family in the foregoing implementations of the first aspect.

With reference to the first aspect, in a possible implementation of the first aspect, the metadata of the first partition further includes a write-ahead logging information set of the first partition, the metadata of the second partition further includes a write-ahead logging information set of the second partition, and the method further includes merging, by the database server, the write-ahead logging information set of the first partition and the write-ahead logging information set of the second partition, to generate a write-ahead logging information set of the third partition, where the write-ahead logging information set of the third partition includes write-ahead logging information in the write-ahead logging information set of the first partition and write-ahead logging information in the write-ahead logging information set of the second partition, N is a positive integer greater than or equal to 2, $N_1$ and $N_2$ are positive integers greater than or equal to 1, and a sum of $N_1$ and $N_2$ is N. In the foregoing technical solution, during merging of the first partition and the second partition, only the write-ahead logging information set of the first partition and the write-ahead logging information set of the second partition may be merged, and corresponding write-ahead logging information does not need to be copied. In this way, the data read/write operations can be reduced, and this reduces a time for which a partition is frozen, improves the partition merging efficiency, and reduces service congestion.

With reference to the first aspect, in a possible implementation of the first aspect, the metadata of the first partition further includes data storage unit information of a primary column family of the first partition, the metadata of the second partition further includes data storage unit information of a primary column family of the second partition, and the method further includes merging, by the database server, the data storage unit information of the primary column family of the first partition and the data storage unit information of the primary column family of the second partition, to generate data storage unit information of a primary column family of the third partition. In the foregoing technical solution, during merging of the first partition and the second partition, only the data storage unit information of the primary column family of the first partition and the data storage unit information of the primary column family of the second partition may be merged, and a data entry in a corresponding data storage unit does not need to be copied. In this way, the data read/write operations can be reduced, and this reduces a time for which a partition is frozen, improves the partition merging efficiency, and reduces service congestion.

With reference to the first aspect, in a possible implementation of the first aspect, the data storage unit information of the primary column family of the first partition includes $K_1$ levels of data storage unit information, where $K_1$ is a positive integer greater than or equal to 1, the data storage unit information of the primary column family of the second partition includes $K_2$ levels of data storage unit information, where $K_2$ is a positive integer greater than or equal to 1, and the data storage unit information of the primary column family of the third partition includes K levels of data storage unit information, where level k data storage unit information in the K levels of data storage unit information included in the data storage unit information of the primary column family of the third partition includes level k data storage unit information in K levels of data storage unit information in the $K_1$ levels of data storage unit information and level k data storage unit information in K levels of data storage unit information in the $K_2$ levels of data storage unit information, K is a minimum value in $K_1$ and $K_2$, and an entry key value of any piece of data storage unit information in the level k data storage unit information in the $K_1$ levels of data storage unit information does not overlap with an entry key value of any piece of data storage unit information in the level k data storage unit information in the $K_2$ levels of data storage unit information.

With reference to the first aspect, in a possible implementation of the first aspect, a prefix of an entry key value in each piece of data storage unit information in the data storage unit information of the primary column family is a partition key value.

According to a second aspect, a database server is provided, and the database server includes units configured to perform the first aspect or any possible implementation of the first aspect.

According to a third aspect, a database server is provided, and the database server includes a processor and a communications interface. The processor implements the first aspect or any possible implementation of the first aspect with reference to the communications interface.

According to a fourth aspect, an embodiment of this application provides a computer storage medium, where a database server runs a computer instruction, to implement the first aspect or any possible implementation of the first aspect.

According to a fifth aspect, this application provides a computer program product including an instruction. When the computer instruction in the computer program product is run on a database server, the database server is enabled to perform the first aspect or any possible implementation of the first aspect.

According to a sixth aspect, this application provides a partition merging method in a distributed database system, where the distributed database system includes a first database server, a second database server, and a management server, the first database server runs a first partition, the second database server runs a second partition, and the method includes creating, by the management server, a third partition, and determining to merge the first partition and the second partition into the third partition, and sending, by the management server, a merging instruction to the first database server, where the merging instruction is used to merge the first partition and the second partition into the third partition, the first partition and the second partition are adjacent partitions, the merging instruction includes an identifier of a current file of the first partition and an identifier of a current file of the second partition, the current file of the first partition records a file identifier of a file that stores metadata of the first partition, and the current file of the second partition records a file identifier of a file that stores metadata of the second partition.

With reference to the sixth aspect, in a possible implementation of the sixth aspect, the management server receives a response message sent by the first database server, where the response message includes an identifier of a current file of a third partition.

With reference to the sixth aspect, in a possible implementation of the sixth aspect, the management server establishes a mapping relationship between the third partition and the first database server. After creating the third partition, the management server updates a partition routing table, where the partition routing table includes the mapping relationship between the third partition and the first database server, and a specific implementation may be a mapping relationship between an identifier of the third partition and an address of the database server.

With reference to the sixth aspect, in a possible implementation of the sixth aspect, the management server determines, based on load of the first database server and load of the second database server, that the first database server merges the first partition and the second partition into the third partition, where the load of the first database server is lighter than the load of the second database server.

According to a seventh aspect, a management server is provided, and the management server includes units configured to perform the sixth aspect or any possible implementation of the sixth aspect.

According to an eighth aspect, a management server is provided, and the management server includes a processor and a communications interface. The processor implements the sixth aspect or any possible implementation of the sixth aspect with reference to the communications interface.

According to a ninth aspect, an embodiment of this application provides a computer storage medium, where a management server runs a computer instruction, to implement the sixth aspect or any possible implementation of the sixth aspect.

According to a tenth aspect, this application provides a computer program product including an instruction. When the computer instruction in the computer program product is run on a management server, the management server is enabled to perform the sixth aspect or any possible implementation of the sixth aspect.

According to an eleventh aspect, this application provides a distributed database system, where the distributed database system includes a first database server, a second database server, and a management server, the first database server is configured to implement the first aspect or any possible implementation of the first aspect, and the management server is configured to implement the sixth aspect or any possible implementation of the sixth aspect.

According to a twelfth aspect, an embodiment of this application provides a partition merging method in a distributed database system, where the distributed database system includes a first database server, a second database server, and a management server, the first database server runs a first partition, and the second database server runs a second partition, and the method includes receiving, by the first database server, a merging instruction sent by the management server, where the merging instruction is used to merge the first partition and the second partition into a third partition, and the first partition and the second partition are adjacent partitions, and obtaining, by the first database server, metadata of the first partition and metadata of the second partition based on the first partition, and merging the metadata of the first partition and the metadata of the second partition, to generate metadata of the third partition.

With reference to the twelfth aspect, in a possible implementation of the twelfth aspect, the merging instruction includes an identifier of a current file of the first partition and an identifier of a current file of the second partition, the current file of the first partition records a file identifier of a file that stores the metadata of the first partition, the current file of the second partition records a file identifier of a file that stores the metadata of the second partition, and obtaining, by the first database server, metadata of the first partition and metadata of the second partition includes obtaining the metadata of the first partition based on the identifier of the current file of the first partition, and obtaining the metadata of the second partition based on the identifier of the current file of the second partition.

For another possible implementation of the twelfth aspect, refer to any possible implementation of the first aspect.

DESCRIPTION OF EMBODIMENTS

Figure 1:
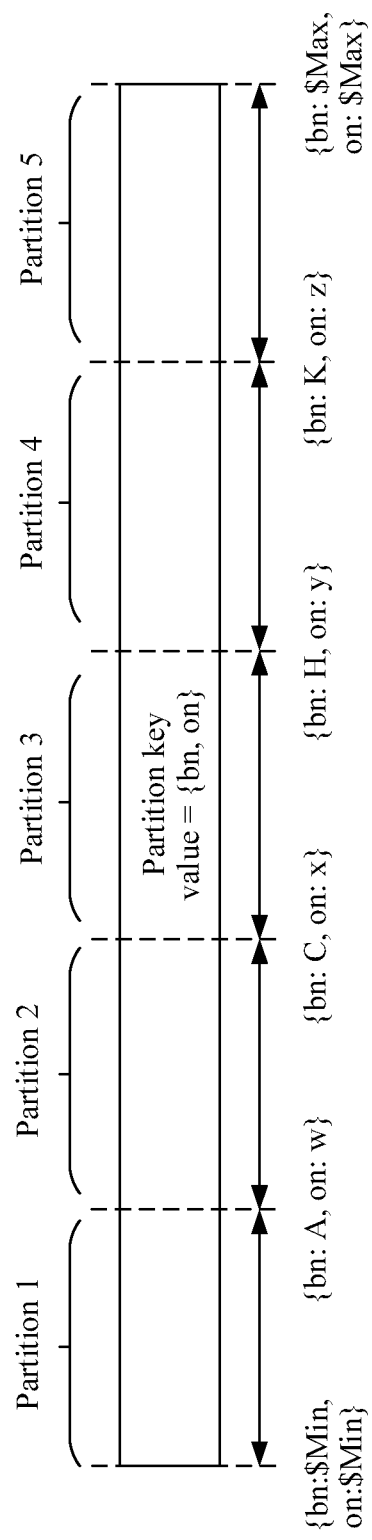
FIG. 1 is a schematic diagram of partitions.

The following describes the technical solutions in this application with reference to the accompanying drawings.

In this application, "at least one" refers to one or more, and "a plurality of" refers to two or more. A term "and/or" describes an association relationship for describing associated objects and represents that three relationships may exist. For example, A and/or B may represent the following three cases: only A exists, both A and B exist, and only B exists. A and B may be in a singular or plural form. The character "1" generally indicates an "or" relationship between associated objects. "At least one of the following" or a similar expression thereof indicates any combination of the following, and includes any combination of one or more of the following. For example, at least one of a, b, or c may indicate a, b, c, a-b, a-c, b-c, or a-b-c, where a, b, and c may be in the singular or the plural form. In addition, in the embodiments of this application, words such as "first" and "second" do not limit a quantity and an execution sequence.

It should be noted that, in this application, the term "an example" or "for example" is used to represent giving an example, an illustration, or a description. Any embodiment or design scheme described as "an example" or "for example" in this application should not be construed as being more preferable or having more advantages than another embodiment or design scheme. Exactly, use of the term "an example", "for example", or the like is intended to present a related concept in a specific manner.

To help a person skilled in the art better understand the embodiments of this application, some basic concepts in a distributed database system in the embodiments of this application are first described.

A KVDB is a database designed for storage using a key value. Data in the database is organized, indexed, and stored in a form of a key value. Common KVDBs include RocksDB, LevelDB, and the like.

Partition key value: In a partitioning technology, a partition is usually determined by fixedly using a value of a column field or a sequentially combined value of several column field values in a data entry in a data table, and the value is referred to as a partition key value (partition key).

Each data entry may uniquely determine, according to a partition key value of the data entry, a partition in which the data entry is located.

The following describes the partition key value with reference to Table 1.

TABLE 1

| bn | on | ver | crt | dlc |
|----|----|-----|-----|-----|
| A | d | 1 | 1501232852986 | 20 |
| A | d | 2 | 1501232852986 | 20 |
| B | x | 1 | 1506710238983 | 20 |

Table 1 shows five column fields {bn, on, ver, crt, dlc} of three data entries. For example, values of five column fields of a first data entry are respectively {A, d, 1, 1501232852986, 20}. A partition key value may be a value of one column field in the five column fields or a sequentially combined value of values of several column fields in the five column fields. For example, it is assumed that the partition key value is a combined value of column fields {bn, on}. It can be learned that in the three data entries, column fields {bn, on} of the first data entry and a second data entry are both {A, d}. That is, partition key values of the first data entry and the second data entry are both {A, d}. Column fields {bn, on} of the third data entry in the three data entries are {B, x}. That is, a partition key value of the third data entry is {B, x}.

For ease of description, a value of the column field on is represented by a letter in Table 1. In actual application, the value of the column field on may be a specific number, for example, 0109 or 0208.

In the embodiments of this application, data entries in a partition are sorted in natural order of partition key values. It is still assumed that the partition key value is a combined value of the column fields {bn, on}FIG. 1 is a schematic diagram of a plurality of partitions with partition key values of {bn, on}. Points on boundaries of the five partitions shown in FIG. 1 may be grouped according to a principle of left-open right-closed or right-open left-closed. If the left-open right-closed principle is used, a data entry with the partition key value bn=A and on=w is in a partition 1. If the right-open left-closed principle is used, the data entry with the partition key value bn=A and on=w is in a partition 2. It can be learned, with reference to the partition schematic diagram in FIG. 1 and the partition key values of the three data entries shown in Table 1, that the first data entry and the second data entry are in the partition 1, and the third data entry is in the partition 2. To ensure that data entries in a partition are sorted in natural order of partition key values, a data table may be split in a range partition manner. Another data table splitting manner may also enable data entries in a partition to be sorted in natural order of partition key values. Therefore, a data table splitting manner is not limited in the embodiments of this application, provided that the data table splitting manner ensures that after the data table is split, the data entries in the partition are sorted in natural order of partition key values. It can be learned from the partitions shown in FIG. 1 that partition key values in the partition 1 and the partition 2 are sorted in natural order and consecutive, and therefore the partition 1 and the partition 2 are referred to as adjacent partitions. In the embodiments of this application, in the KVDB, different database servers manage the data entries in the data table at a granularity of a partition. That is, the database server provides access to a data entry of a partition, or the database server serves the partition, or the database server runs the partition.

Partition routing table: A partition routing table may include the following information: a partition identifier and an address of a home database server, and may further include a partition root index file identifier, a left boundary of a partition, a right boundary of a partition, a partition status, and the like. The address of the database server may be an Internet Protocol (IP) address, an identifier of the database server, or the like. This is not limited in the embodiments of the present disclosure. The partition routing table is also referred to as a partition view. FIG. 1 is the schematic diagram of partitions. For example, Table 2 is a partition routing table that is based on the plurality of partitions shown in FIG. 1. The partition root index file identifier identifies a file name of a manifest file of each partition, and the partition status indicates a current state of a partition, for example, a normal service state, a split state, a combined state, or an isolated state. As shown in Table 2, "Normal" indicates that a current state of a partition is the normal service state.

TABLE 2

| Partition identifier | Partition root index file identifier | Left boundary of a partition | Right boundary of a partition | Address of a home database server | Partition status |
|---|---|---|---|---|---|
| Partition 1 | Pt1_root_file | {bn: $Min, on: $Min} | {bn: A, on: w} | 8.11.234.1:27021 | Normal |
| Partition 2 | Pt2_root_file | {bn: A, on: w} | {bn: C, on: x} | 8.11.234.2:27021 | Normal |
| Partition 3 | Pt3_root_file | {bn: C, on: x} | {bn: H, on: y} | 8.11.234.3:27021 | Normal |
| Partition 4 | Pt4_root_file | {bn: H, on: y} | {bn: K, on: z} | 8.11.234.4:27021 | Normal |
| Partition 5 | Pt5_root_file | {bn: K, on: z} | {bn: $Max, on: $Max} | 8.11.234.5:27021 | Normal |

$Min indicates infinitesimal, and $Max indicates infinity. The partition routing table is queried using a partition key value of a data entry as an input, and information such as a partition to which the data entry belongs and a home database server may be obtained. In an example of using the third data entry in Table 1, the partition key value of the data entry is {B, x}. According to the partition routing table shown in Table 2, it may be determined that the data entry belongs to the partition 2, and an address of a home database server is 8.11.234.2:27021.

Partition merging described in the embodiments of this application is merging of adjacent partitions, for example, merging of the partition 1 and the partition 2, merging of a partition 3 and a partition 4, or merging of a partition 4 and a partition 5.

A primary index entry includes a partition key value. In addition to the partition key value, the primary index entry may further include values of a plurality of other column fields of a data entry. The partition key value and values of one or more of the other column fields may form the primary index entry. Still in an example of Table 1, the primary index entry may include the five column fields {bn, on, ver, crt, dlc} shown in Table 1, a key value of a primary index entry corresponds to column fields {bn, on, ver}, and {bn, on} may be referred to as a prefix of the primary index entry. It can be learned that {bn, on} is a partition key value. Therefore, the primary index entry is a primary index entry prefixed with a partition key value. An entry key value is a unique index of a data entry, and may include a plurality of column fields of the data entry.

A secondary index entry may also be referred to as an auxiliary index entry. In a distributed database system, to meet a complex query scenario, one or more secondary index entries may be created for each data entry. The secondary index entry includes a secondary index column field and a column field corresponding to the key value of the primary index entry. A format of the secondary index entry may be the secondary index column field+the column field corresponding to the key value of the primary index entry, or referred to as the secondary index column field and the column field corresponding to the primary index entry key value. In this case, the secondary index entry is a secondary index entry prefixed with a non-partition key value. The format of the secondary index entry may alternatively be the column field corresponding to the key value of the primary index entry+the secondary index column field. In this case, the secondary index entry is a secondary index entry prefixed with a partition key value. When each data entry includes a plurality of secondary index entries, different secondary index entries in the plurality of secondary index entries include different secondary index column fields. For example, assuming that each data entry includes two secondary index entries, one secondary index column field may be dlc, and the other secondary index column field may be crt.

Each partition may include one primary index entry set or one or more secondary index entry sets. The primary index entry set includes all primary index entries in the partition. The primary index entries in the primary index entry set are sorted according to key values of primary index entries.

Secondary index entries in the secondary index entry set are sorted according to key values of secondary index entries. If each partition includes a plurality of secondary index entry sets, each secondary index entry set includes secondary index entries with same secondary index entry column fields. Assuming that each data entry includes two secondary index entries, one secondary index column field may be dlc, and the other secondary index column field may be crt. The partition may include two secondary index entry sets, one secondary index entry set includes all secondary index entry key values of the secondary index column field of crt in the partition, and the other secondary index entry set includes all secondary index entry key values of the secondary index column field of dlc in the partition.

A plurality of column fields having same characteristics may be grouped into a column family. As described above, the primary index entries included in the primary index entry set have a plurality of same column fields. Therefore, a primary index entry set may be referred to as a column family, and the column family may be referred to as a primary index column family. Similarly, the secondary index entries included in the secondary index entry set also have a plurality of same column fields. Therefore, a secondary index entry may also be used as a column family, and the column family may be referred to as a secondary index column family.

Some embodiments of this application are described using an example of a KVDB using an LSM-tree algorithm. Therefore, the LSM-tree is briefly described below.

Write-ahead logging (WAL) file: When a data entry is inserted into the KVDB, the data entry is first written into a WAL file, and is inserted into a memory table (MemTable) after being successfully written.

MemTable: A MemTable corresponds to a WAL file, and is an ordered organization structure of WAL file content in a memory. The MemTable provides operation structures for writing, deleting, and reading key value data (data entries). The data entries are sequentially stored according to entry key values in the MemTable.

Immutable MemTable: After memory space occupied by a MemTable reaches an upper limit value, data entries that are sequentially stored according to entry key values in a memory need to be flushed to a SSTable, and a new data entry is no longer written into a corresponding WAL file. In this case, the MemTable is frozen into an immutable MemTable, and a new MemTable is generated at the same time. The new data entry is recorded in a new WAL file and the newly generated MemTable. Data entries in the immutable MemTable are immutable. That is, the data entries in the immutable MemTable can only be read and cannot be written or deleted. The SSTable is a data storage unit in the KVDB. Entry key values in each SSTable are ordered. After all immutable MemTables are compacted, an SSTable is obtained. A process of compacting the immutable MemTables to obtain the SSTable may be referred to as minor compaction.

SSTable files in the KVDB are stored in different levels: level 0 to level n, where n is a positive integer greater than or equal to 1. The level 0 includes a plurality of SSTable files. In the plurality of SSTables, one S Stable is obtained after minor compaction is performed on an immutable MemTable. That is, minor compaction is performed on a plurality of immutable MemTables, to obtain respective SSTables. Entry key values in different SSTables in the plurality of SSTables overlap. After a specific condition is met, a level 0 SSTable and a level 1 SSTable are compacted, and an SSTable obtained after the compaction is an SSTable stored at a level 1.

A specified quantity of SSTables are maintained at each level of the level 1 to the level n, and entry key values in all SSTables at each level do not overlap. When SSTables at a level meet a condition, the SSTables at the level may be selected and compacted with SSTables at a next level (to be specific, a level corresponding to a number obtained after a number of the level is increased by 1, for example, a next level of the level 1 is a level 2, a next level of the level 2 is a level 3, and so on). After the compaction, the selected SSTables are deleted. The compaction of SSTables of the two levels may be referred to as major compaction.

Manifest file: A manifest file is used to record WAL file information and SSTable information. The WAL file information recorded in the manifest file includes an identifier of a WAL file and a time sequence number of the WAL file. The SSTable information recorded in the manifest file includes one or more of a column family to which an SSTable belongs, a level to which the SSTtable belongs, an identifier of the SSTable, a time sequence number of the SSTable, a size of the SSTable, a minimum entry key value of the SSTable, and a maximum entry key value of the SSTable.

Figure 2:
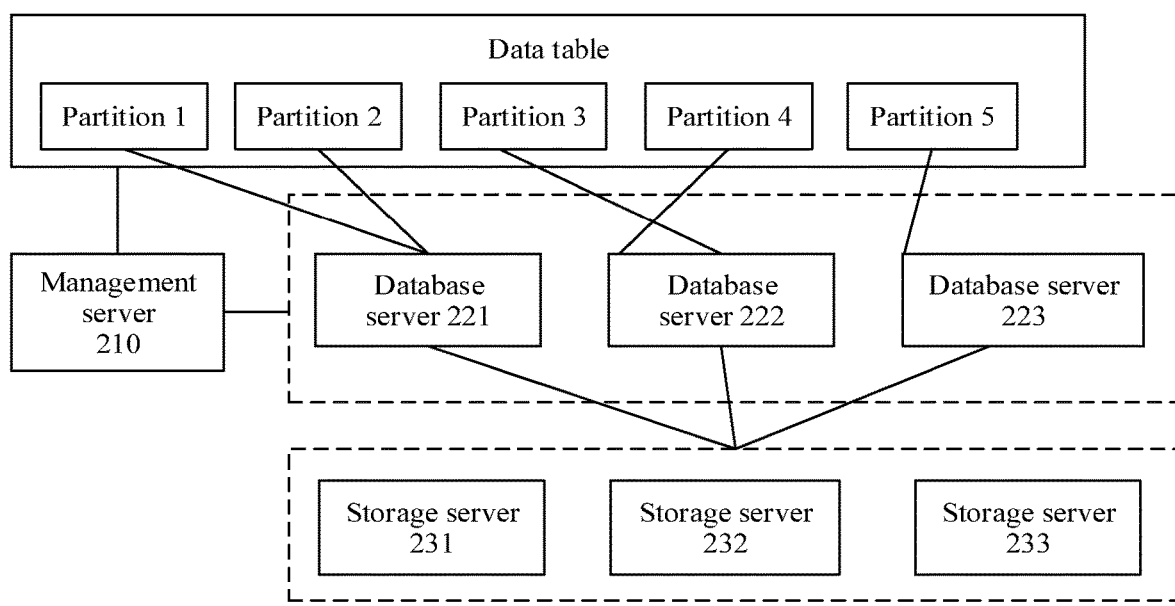
FIG. 2 is a schematic architectural diagram of a KVDB.

The following describes the KVDB with reference to FIG. 2.

A KVDB 200 shown in FIG. 2 includes a management server 210, a database server 221, a database server 222, and a database server 223. The KVDB 200 shown in FIG. 2 may further include a storage server 231, a storage server 232, and a storage server 233.

The database server 221, the database server 222, and the database server 223 may be collectively referred to as a distributed database service cluster. The storage server 231, the storage server 232, and the storage server 233 may provide a distributed shared storage pool for the KVDB. In specific implementation, centralized storage may also be used to provide a storage resource for the KVDB. For example, a storage array provides a storage resource for the KVDB.

The management server 210 is responsible for specifying a homing relationship between a partition and a database server, and further responsible for maintaining a partition routing table.

The foregoing operations of freezing a MemTable into an immutable MemTable, minor compaction, and major combination may all be performed by a database server.

In a distributed database system, one database server is responsible for storage management of data entries in one partition. Therefore, in an example of a storage server, a WAL file, an SSTable, and a manifest file of a corresponding partition that are generated by a database server may be persisted in the storage server, and the database server may access the WAL file, the SSTable, and the manifest file of the corresponding partition that are stored in the storage server. The MemTable and the immutable MemTable are both stored in a memory of the database server.

Figure 3A:
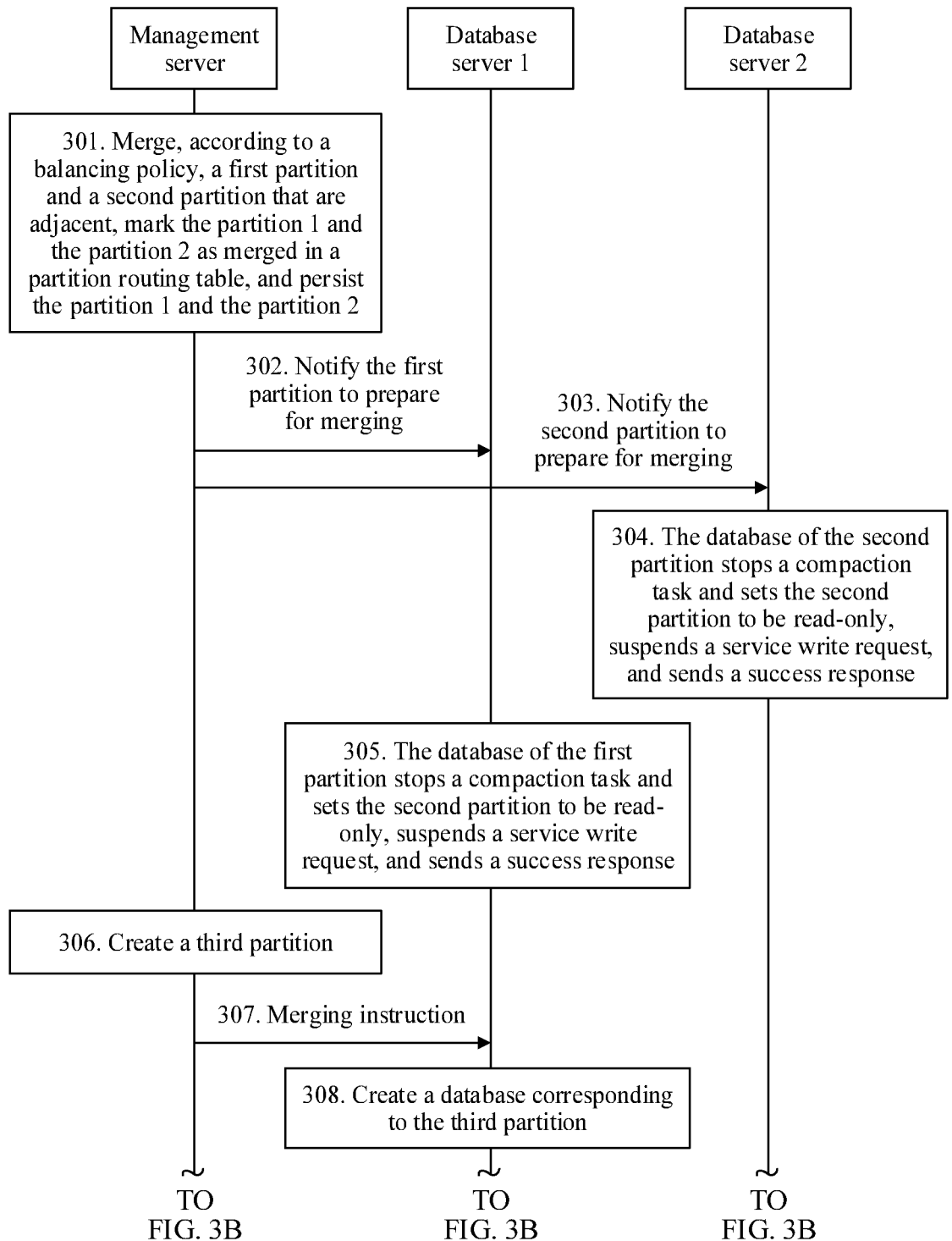
FIG. 3A and FIG. 3B are a schematic flowchart of a partition processing method according to an embodiment of this application.
Figure 3B:
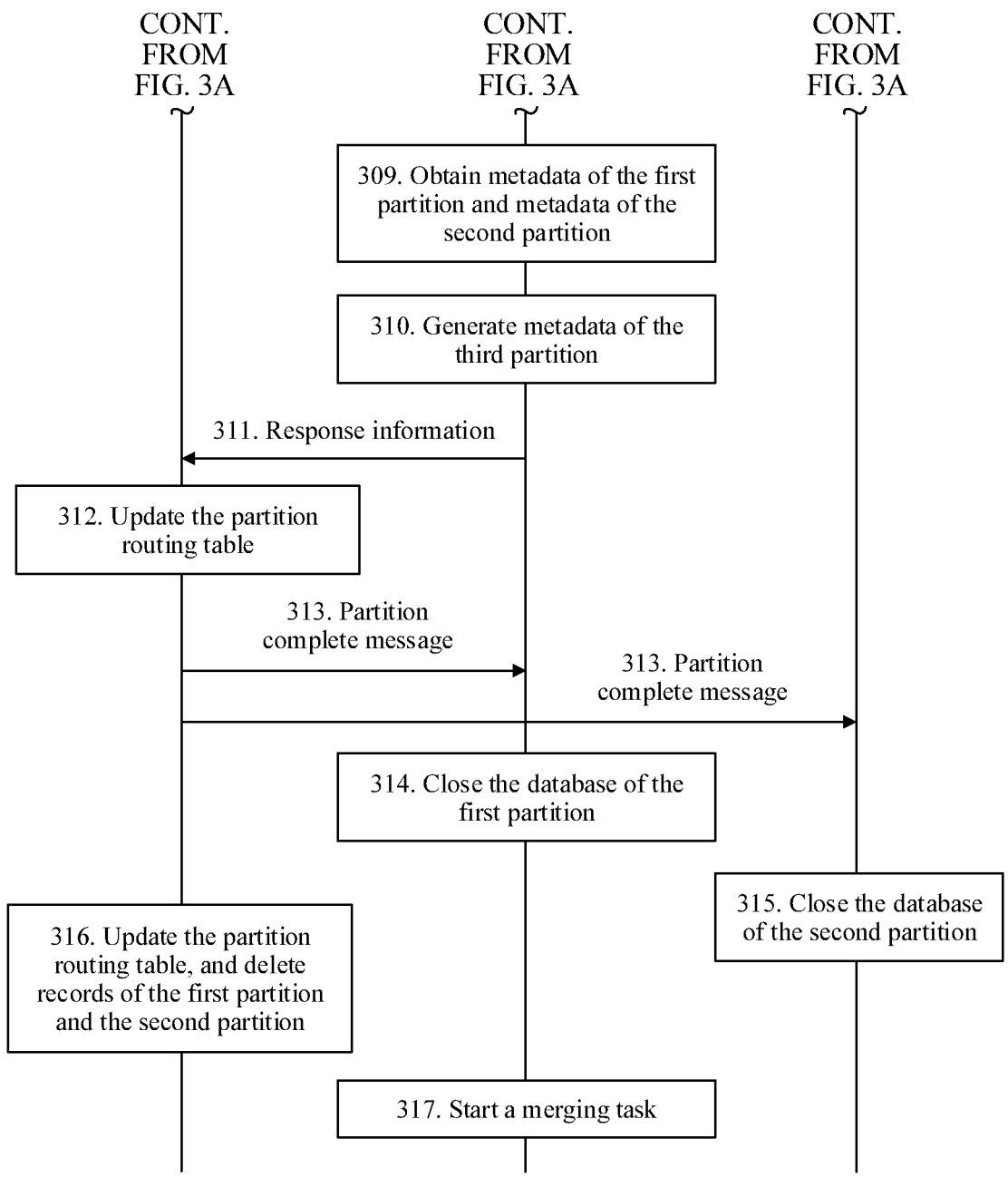

FIG. 3A and FIG. 3B are a schematic flowchart of a partition processing method according to an embodiment of this application. The method shown in FIG. 3A and FIG. 3B may be applied to a KVDB based on an LSM-tree. A database server 1 serves a partition 1, and a database server 2 serves a partition 2.

301. A management server merges, according to a balancing policy, the first partition and the second partition that are adjacent, marks the partition 1 and the partition 2 as merged in a partition routing table, and persists the partition 1 and the partition 2.

The balancing policy may be a quantity or access popularity of data entries in a partition, or the like, or may be load of a database server that runs the partition, or the like.

302. The management server notifies the first partition of the database server 1 to prepare for merging.

303. The management server notifies the second partition of the database server 2 to prepare for merging.

304. The database server 2 stops a merging task, sets the second partition to be read-only, suspends a write request, and sends a success response to the management server.

Further, if the database server 2 has a merging task that is not started, the database server 2 stops a merging task. If the database server 2 is performing a merging task, the database server 2 stops a merging task after completing the ongoing merging task. That is, after receiving a notification of preparing for merging sent by the management server 1, the database server 2 does not change content stored in the second partition.

305. The database server 1 stops a merging task, sets the first partition to be read-only, suspends a write request, and sends a success response to the management server.

Step 305 is similar to step 304, and details are not described herein again. 306. The management server creates a third partition in a distributed database system, and marks the third partition as initial in the partition routing table.

In specific implementation, that the management server creates a third partition in a distributed database system may be generating an identifier of the third partition, and adding the identifier of the third partition to the partition routing table. For example, in a specific implementation process of this embodiment of this application, the management server may determine, based on load of the database server 1 and load of the database server 2, that the database server 1 with lighter load runs the third partition. For example, if the load of the database server 1 is lighter, the database server 1 runs the third partition, and the database server 1 serves the third partition. It may be understood that, optionally, the management server may alternatively instruct another database server (for example, the database server 2 or a database server 3) to merge the first partition and the second partition into the third partition. That is, the other database server runs the third partition. In a specific implementation process of this embodiment of this application, in another implementation, a database server that runs the third partition is randomly selected from the database server 1 and the database server 2, or a database server that runs the third partition is selected from the database server 1 and the database server 2 using a specific algorithm. For example, a database server that runs the third partition may be determined by performing a modulo operation on a total quantity of partitions based on hash or partition identifiers (for example, partition numbers) managed by a database server. Further, the management server determines, according to the foregoing implementations, a database server that runs the third partition.

307. The management server sends a merging instruction to the database server 1, where the merging instruction is used to merge the first partition and the second partition into the third partition.

In this embodiment of this application, the first partition and the second partition are merged into the third partition by merging metadata of the first partition and metadata of the second partition into metadata of the third partition. That is, data entries in the first partition and data entries in the second partition can be accessed by accessing the metadata of the third partition. Further, in an implementation, the merging instruction includes an identifier of a current file in the first partition and an identifier of a current file of the second partition. The current file of the first partition records a file identifier of a file that stores the metadata of the first partition. The current file of the second partition records a file identifier of a file that stores the metadata of the second partition. In an example of the KVDB using an LSM-tree algorithm, a manifest file in the KVDB using the LSM-tree algorithm is used to store metadata of a partition. Therefore, a file identifier, of a file that stores the metadata of the partition, stored in a current file may be an identifier of the manifest file in the KVDB using the LSM-tree algorithm.

308. The database server 1 creates a database corresponding to the third partition.

The database server 1 creates the database corresponding to the third partition. One implementation is starting a new database process or database instance. Another implementation may be using a currently running database process or database instance as the database of the third partition.

309. The database server 1 obtains the metadata of the first partition and the metadata of the second partition.

In specific implementation, the database server 1 reads the current file of the first partition to obtain the metadata of the first partition, reads the current file of the second partition to obtain the metadata of the second partition, and loads the metadata of the first partition and the metadata of the second partition into a memory of the database server 1.

In another implementation, the database server 1 obtains, from the management server, an address of the database server 2 that runs the second partition, and the database server 1 obtains the metadata of the second partition from the database server 2, or the database server 1 obtains information about the metadata of the second partition from the database server 2, and obtains the metadata of the second partition based on the information about the metadata of the second partition. The information about the metadata of the second partition may be the file identifier of the file that stores the metadata of the second partition.

310. The database server 1 merges the metadata of the first partition and the metadata of the second partition, to generate the metadata of the third partition.

Further, the database server 1 generates the metadata of the third partition. Further, the database server 1 creates a current file for the third partition, and the current file of the third partition records a file identifier of a file that stores the metadata of the third partition.

The metadata of the first partition includes data storage unit information of a secondary column family of the first partition. The metadata of the second partition includes data storage unit information of a secondary column family of the second partition. In the example of the KVDB using the LSM-tree algorithm, data storage unit information is SSTable information, and a data storage unit is an SSTable.

In the first partition and the second partition, an index (including a primary index and a secondary index) entry prefixed with a partition key value and a secondary index entry prefixed with a non-partition key value are organized and stored in different column families. Data storage unit information of a primary column family is related information for organizing and storing an index (including a primary index and a secondary index) entry prefixed with a partition key value. Data storage unit information of a secondary column family is related information for organizing and storing a secondary index entry prefixed with a non-partition key value.

The database server 1 may merge the data storage unit information of the secondary column family of the first partition and the data storage unit information of the secondary column family of the second partition, to generate data storage unit information of a target secondary column family. Optionally, in some embodiments, the data storage unit information of the target secondary column family may be used as data storage unit information of a secondary column family of the third partition. Optionally, in some other embodiments, the database server 1 may determine the data storage unit information of the secondary column family of the third partition based on the data storage unit information of the target secondary column family.

The data storage unit information of the secondary column family of the first partition includes $P_1$ levels of data storage unit information, where $P_1$ is a positive integer greater than or equal to 2. The data storage unit information of the secondary column family of the second partition includes $P_2$ levels of data storage unit information, where $P_2$ is a positive integer greater than or equal to 2. The data storage unit information of the target secondary column family includes Q levels of data storage unit information, and the Q levels of data storage unit information include the data storage unit information of the secondary column family of the first partition and the data storage unit information of the secondary column family of the second partition. A level of data storage unit information in the Q levels of data storage unit information includes a level of data storage unit information in the $P_1$ levels of data storage unit information and a level of data storage unit information in the $P_2$ levels of data storage unit information. A level of data storage unit information in (Q−1) levels of data storage unit information in the Q levels of data storage unit information includes a level of data storage unit information in the $P_1$ levels of data storage unit information or a level of data storage unit information in the $P_2$ levels of data storage unit information, where Q is equal to $P_1+P_2-1$.

Optionally, in some embodiments, level 0 data storage unit information in the Q levels of data storage unit information includes level 0 data storage unit information in the data storage unit information of the secondary column family of the first partition and level 0 data storage unit information in the data storage unit information of the secondary column family of the second partition. Level (2×q−1) data storage unit information in the Q levels of data storage unit information includes level q data storage unit information in P levels of data storage unit information in the $P_1$ levels of data storage unit information, and level (2×q) data storage unit information in the Q levels of data unit storage information includes level q data storage unit information in P levels of data storage unit information in the $P_2$ levels of data storage unit information, where $q=1,\ldots,P-1$, a value of P is a value obtained by subtracting 1 from a minimum value in $P_1$ and $P_2$.

Optionally, in some embodiments, the P levels of data storage unit information in the $P_1$ levels of data storage unit information may be level 0 to level (P−1) data storage unit information in the $P_1$ levels of data storage unit information. Similarly, the P levels of data storage unit information in the $P_2$ levels of data storage unit information may be level 1 to level P data storage unit information in the $P_2$ levels of data storage unit information.

Optionally, in some embodiments, the P levels of data storage unit information in the $P_1$ levels of data storage unit information may be a last level to a $P^{th}$ to last level of data storage unit information in the $P_1$ levels of data storage unit information. Similarly, the P levels of data storage unit information in the $P_2$ levels of data storage unit information may be a last level to a $P^{th}$ to last level of data storage unit information in the $P_2$ levels of data storage unit information.

Optionally, in some embodiments, the P levels of data storage unit information in the $P_1$ levels of data storage unit information may be intermediate P levels of data storage unit information in the $P_1$ levels of data storage unit information. For example, the P levels of data storage unit information in the $P_1$ levels of data storage unit information are level 2 to level (P+1) data storage unit information in the $P_1$ levels of data storage unit information. Similarly, the P levels of data storage unit information in the $P_2$ levels of data storage unit information may be intermediate P levels of data storage unit information in the $P_2$ levels of data storage unit information. For example, the P levels of data storage unit information in the $P_2$ levels of data storage unit information are level 2 to level (P+1) data storage unit information in the $P_2$ levels of data storage unit information.

In the example of the KVDB using the LSM-tree algorithm, as described above, data storage unit information is SSTable information, and a data storage unit is an SSTable.

A manifest file of the first partition includes $P_1$ levels of SSTable information of the secondary column family, and index entries of the $P_1$ levels of SSTable information are secondary index entries prefixed with non-partition key values. A manifest file of the second partition includes $P_2$ levels of SSTable information of the secondary column family, and index entries of the $P_2$ levels of SSTable information are secondary index entries prefixed with non-partition key values. A target manifest file includes Q levels of SSTable information of the secondary column family, and index entries of the Q levels of SSTable information are secondary index entries prefixed with non-partition key values. Optionally, in some embodiments, the target manifest file may be a manifest file of the third partition. Optionally, in some other embodiments, the target manifest file may be used to determine the manifest file of the third partition.

It is assumed that values of $P_1$ and $P_2$ are both 2. In this case, Q=2+2−1=3. In this case, the manifest file of the first partition includes two levels of SSTable information of the secondary column family: level 0 SSTable information and level 1 SStable information. The mannifest file of the second partition includes two levels of SSTable information of the secondary column family: level 0 SSTable information and level 1 SStable information. The target manifest file includes three levels of SSTable information of the secondary column family: level 0 SSTable information to level 2 SStable information.

The level 0 SSTable information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the first partition.

The level 2 SSTable information in the target manifest file includes the level 1 SSTable information in the manifest file of the second partition.

The following describes merging of the data storage unit information of the secondary column family with reference to Table 3, Table 4, and Table 5.

TABLE 3

| Column family identifier | Level identifier | SSTable identifier | SSTable time sequence number | SSTable size | Minimum entry key value of an SSTable | Maximum entry key value of an SSTable |
| --- | --- | --- | --- | --- | --- | --- |
| Secondary column family | 0 | f1a.0.1 | 0 | 30 megabytes (MB) | 21, A1 | 21, B9 |
| Secondary column family | 0 | f1a.0.2 | 1 | 30 MB | 20, A11 | 20, B21 |
| Secondary column family | 1 | f1a.1.1 | 3 | 2 MB | 15, A1 | 15, B1 |
| Secondary column family | 1 | f1a.1.2 | 4 | 2 MB | 15, B2 | 15, B23 |

Table 3 shows two levels of data storage unit information included in the data storage unit information of the secondary column family of the first partition, and each level of data storage unit information in the two levels of data storage unit information includes two pieces of data storage unit information. Table 3 is a table obtained in the example of the KVDB using the LSM-tree algorithm. Therefore, correspondingly, the data storage unit information may also be referred to as SSTable information.

TABLE 4

| Column family identifier | Level identifier | SSTable identifier | SSTable time sequence number | SSTable size | Minimum entry key value of an SSTable | Maximum entry key value of an SSTable |
| --- | --- | --- | --- | --- | --- | --- |
| Secondary column family | 0 | f2a.0.1 | 0 | 30 MB | 21, C1 | 21, F2 |
| Secondary column family | 0 | f2a.0.2 | 1 | 30 MB | 20, D11 | 21, E1 |
| Secondary column family | 1 | f2a.1.1 | 2 | 2 MB | 15, C1 | 15, C9 |
| Secondary column family | 1 | f2a.1.2 | 4 | 2 MB | 15, C10 | 15, D10 |

Table 4 shows two levels of data storage unit information included in the data storage unit information of the secondary column family of the second partition, and each level of data storage unit information in the two levels of data storage unit information includes two pieces of data storage unit information. Table 4 is a table obtained in the example of the KVDB using the LSM-tree algorithm. Therefore, correspondingly, the data storage unit information may also be referred to as SSTable information.

TABLE 5

| Column family identifier | Level identifier | SSTable identifier | SSTable time sequence number | SSTable size | Minimum entry key value of SSTable | Maximum entry key value of an SSTable |
|---|---|---|---|---|---|---|
| Secondary column family | 0 | f1a.0.1 | 0 | 30 MB | 21, A1 | 21, B9 |
| Secondary column family | 0 | f1a.0.2 | 1 | 30 MB | 20, A11 | 20, B21 |
| Secondary column family | 0 | f2a.0.1 | 0 | 30 MB | 21, C1 | 21, F2 |
| Secondary column family | 0 | f2a.0.2 | 1 | 30 MB | 20, D11 | 21, E1 |
| Secondary column family | 1 | f1a.1.1 | 3 | 2 MB | 15, A1 | 15, B1 |
| Secondary column family | 1 | f1a.1.2 | 4 | 2 MB | 15, B2 | 15, B23 |
| Secondary column family | 2 | f2a.1.1 | 2 | 2 MB | 15, C1 | 15, C9 |
| Secondary column family | 2 | f2a.1.2 | 4 | 2 MB | 15, C10 | 15, D10 |

Table 5 shows three levels of data storage unit information included in the data storage unit information of the target secondary column family, level 0 data storage unit information in the three levels of data storage unit information includes four pieces of data storage unit information, and level 1 and level 2 data storage unit information each include two pieces of data storage unit information. Table 5 is a table obtained in the example of the KVDB using the LSM-tree algorithm. Therefore, correspondingly, the data storage unit information may also be referred to as SSTable information. It can be learned that the level 0 SSTable information shown in Table 5 includes the level 0 SSTable information shown in Table 3 and Table 4, and the level 1 SSTable information shown in Table 5 includes the level 1 SSTable information shown in Table 3. The level 2 SSTable information shown in Table 5 includes the level 2 SSTable information shown in Table 4. That is, the level 0 SSTable information in the target manifest file obtained by merging includes the level 0 SSTable information in the manifest file of the first partition and the level 0 SSTable information in the manifest file of the second partition, the level 1 SSTable information in the target manifest file obtained by merging includes the level 1 SSTable information in the manifest file of the first partition, and the level 2 SSTable information in the target manifest file obtained by merging includes the level 1 SSTable information in the manifest file of the second partition.

Optionally, in some other embodiments, level $(2 \times q-1)$ data storage unit information in the Q levels of data storage unit information includes level q data storage unit information in P levels of data storage unit information of the secondary column family of the second partition, and level $(2 \times q)$ data storage unit information in the $(2 \times P)$ levels of data storage unit information includes level q data storage unit information in P levels of data storage unit information of the secondary column family of the first partition.

It is assumed that values of $P_1$ and $P_2$ are both 2. In this case, $Q=2+2-1=3$. In this case, a manifest file of the first partition includes level 0 SSTable information and level 1 SStable information. A manifest file of the second partition includes level 0 SSTable information and level 1 SStable information. A target manifest file includes three levels of SSTable information of the secondary column family: level 0 SSTable information to level 2 SStable information.

The level 0 SSTable information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the second partition.

The level 2 SSTable file information in the target manifest file includes the level 1 SSTable information in the manifest file of the first partition.

In the foregoing embodiment, the SSTable information from the first partition and the SSTable information from the second partition are alternated with each other. In some other embodiments, the SSTable information from the first partition and the SStable information from the second partition may alternatively be stacked.

Optionally, in some embodiments, level 0 data storage unit information in the Q levels of data storage unit information includes level 0 data storage unit information of the first partition and level 0 data storage unit information of the second partition, level 1 data storage unit information to level (P−1) data storage unit information in the Q levels of data storage unit information are respectively level 1 data storage unit information to level (P−1) data storage unit information in P levels of data storage unit information of the first partition, and level P data storage unit information to level (Q−1) data storage unit information in the Q levels of data storage unit information are respectively level 1 data storage unit information to level (P−1) data storage unit information in P levels of data storage unit information of the second partition.

It is assumed that values of $P_1$ and $P_2$ are both 4. In this case, Q=4+4−1=7. In this case, a manifest file of the first partition includes four levels of SSTable information of the secondary column family: level 0 SSTable information to level 3 SStable information. A manifest file of the second partition includes four levels of SSTable information of the secondary column family: level 0 SSTable information to level 3 SStable information. A target manifest file includes seven levels of SSTable information of the secondary column family: level 0 SSTable information to level 6 SStable information.

The level 0 SSTable information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the first partition.

The level 2 SSTable information in the target manifest file includes the level 2 SSTable information in the manifest file of the first partition.

The level 3 SSTable information in the target manifest file includes the level 3 SSTable information in the manifest file of the first partition.

The level 4 SSTable information in the target manifest file includes the level 1 SSTable information in the manifest file of the second partition.

The level 5 SSTable information in the target manifest file includes the level 2 SSTable information in the manifest file of the second partition.

The level 6 SSTable information in the target manifest file includes the level 3 SSTable information in the manifest file of the second partition.

Optionally, in some other embodiments, level 0 data storage unit information in the Q levels of data storage unit information includes level 0 data storage unit information of the first partition and level 0 data storage unit information of the second partition, level 1 data storage unit information to level (P−1) data storage unit information in the Q levels of data storage unit information are respectively level 1 data storage unit information to level (P−1) data storage unit information in P levels of data storage unit information of the second partition, and level P data storage unit information to level (Q−1) data storage unit information in the Q levels of data storage unit information are respectively level 1 data storage unit information to level (P−1) data storage unit information in P levels of data storage unit information of the first partition.

It is assumed that values of $P_1$ and $P_2$ are both 4. In this case, Q=4+4−1=7. In this case, a manifest file of the first partition includes level 0 SSTable information to level 3 SStable information. A manifest file of the second partition includes level 0 SSTable information to level 3 SStable information. A target manifest file includes seven levels of SSTable information of the secondary column family: level 0 SSTable information to level 6 SStable information.

The level 0 SSTable information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the second partition.

The level 2 SSTable information in the target manifest file includes the level 2 SSTable information in the manifest file of the second partition.

The level 3 SSTable information in the target manifest file includes the level 3 SSTable information in the manifest file of the second partition.

The level 4 SSTable information in the target manifest file includes the level 1 SSTable information in the manifest file of the first partition.

The level 5 SSTable information in the target manifest file includes the level 2 SSTable information in the manifest file of the first partition.

The level 6 SSTable information in the target manifest file includes the level 3 SSTable information in the manifest file of the first partition.

It can be learned that in a process of merging data storage unit information of secondary column families of adjacent partitions, a manner of merging level 0 data storage unit information is directly merging level 0 data storage unit information in the data storage unit information of the secondary column families of the two partitions into level 0 data storage unit information of a secondary column family. That is, in this merging manner, the level 0 data storage unit information in the second partition is directly appended to the level 0 data storage unit information in the first partition. This merging manner may be referred to as append merging. However, in the process of merging data storage unit information of the secondary column families of the adjacent partitions, data storage unit information other than the level 0 data storage unit information is merged by stacking. This merging manner may be referred to as stack merging below.

In the foregoing example, the values of $P_1$ and $P_2$ are the same. In some cases, the values of $P_1$ and $P_2$ may be different. In this case, (2×P) levels of data storage unit information in the Q levels of data storage units may include the P levels of data storage unit information in the $P_1$ levels of data storage unit information and the P levels of data storage unit information in the $P_2$ levels of data storage unit information. (Q−2×P) levels of data storage unit information in the Q levels of data storage unit information may include P' levels of data storage unit information, where a value of P' is max($P_1$, $P_2$)−min($P_1$, $P_2$), max($P_1$, $P_2$) represents a maximum value in $P_1$ and $P_2$, and min($P_1$, $P_2$) represents a minimum value in $P_1$ and $P_2$. That is, P' is equal to the maximum value in $P_1$ and $P_2$ minus the minimum value in $P_1$ and $P_2$. Alternatively, the value of P' is $|P_1-P_2|$, that is, the value of P' is an absolute value of a difference between $P_1$ and $P_2$.

For example, assuming that $P_1$=5 and $P_2$=3, in this case, Q=5+3−1=7. In this case, the manifest file of the first partition includes five levels of SSTable information of the secondary column family: level 0 SSTable information to level 4 SStable information. The manifest file of the second partition includes three levels of SSTable information of the secondary column family: level 0 SSTable information to level 2 SStable information. The target manifest file includes seven levels of SSTable information of the secondary column family: level 0 SSTable information to level 6 SStable information.

The level 0 SSTable file information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the first partition.

The level 2 SSTable information in the target manifest file includes the level 1 SSTable information in the manifest file of the second partition.

The level 3 SSTable information in the target manifest file includes the level 2 SSTable information in the manifest file of the first partition.

The level 4 SSTable information in the target manifest file includes the level 2 SSTable information in the manifest file of the second partition.

The level 5 SSTable information in the target manifest file includes the level 3 SSTable information in the manifest file of the first partition.

The level 6 SSTable information in the target manifest file includes the level 4 SSTable information in the manifest file of the first partition.

That is, the P' levels of data storage unit information may be the last P' levels of data storage unit information in the Q levels of data storage unit information.

Optionally, in some other embodiments, the P' levels of data storage unit information may alternatively be the first P' levels of data storage unit information in the Q levels of data storage unit information.

For example, assuming that $P_1=5$ and $P_2=3$, in this case, $Q=5+3-1=7$. In this case, the manifest file of the first partition includes five levels of SSTable information of the secondary column family: level 0 SSTable information to level 4 SStable information. The manifest file of the second partition includes three levels of SSTable information of the secondary column family: level 0 SSTable information to level 2 SStable information. The target manifest file includes seven levels of SSTable information of the secondary column family: level 0 SSTable information to level 6 SStable information.

The level 0 SSTable information in the target manifest file includes the level 0 SSTable information in the manifest file of the first partition and the level 0 SSTable information in the manifest file of the second partition.

The level 1 SSTable information in the target manifest file includes the level 1 SSTable information in the manifest file of the first partition.

The level 2 SSTable information in the target manifest file includes the level 2 SSTable information in the manifest file of the first partition.

The level 3 SSTable information in the target manifest file includes the level 3 SSTable information in the manifest file of the first partition.

The level 4 SSTable information in the target manifest file includes the level 1 SSTable information in the manifest file of the second partition.

The level 5 SSTable information in the target manifest file includes the level 4 SSTable information in the manifest file of the first partition.

The level 6 SSTable information in the target manifest file includes the level 2 SSTable information in the manifest file of the second partition.

The metadata of the first partition further includes data storage unit information of a primary column family of the first partition. The metadata of the second partition includes data storage unit information of a primary column family of the second partition.

The database server 1 may merge the data storage unit information of the primary column family of the first partition and the data storage unit information of the primary column family of the second partition, to generate data storage unit information of a primary column family of the third partition.

The data storage unit information of the primary column family of the first partition includes $K_1$ levels of data storage unit information, where $K_1$ is a positive integer greater than or equal to 1. The data storage unit information of the primary column family of the second partition includes $K_2$ levels of data storage unit information, where $K_2$ is a positive integer greater than or equal to 1. The metadata of the third partition includes the data storage unit information of the primary column family of the third partition. The data storage unit information of the primary column family of the third partition includes K levels of data storage unit information, where level k data storage unit information in the data storage unit information of the primary column family of the third partition includes level k data storage unit information in K levels of data storage unit information in the $K_1$ levels of data storage unit information and level k data storage unit information in K levels of data storage unit information in the $K_2$ levels of data storage unit information, K is a minimum value in $K_1$ and $K_2$, and an entry key value of any piece of data storage unit information in the level k data storage unit information in the $K_1$ levels of data storage unit information does not overlap with an entry key value of any piece of data storage unit information in the level k data storage unit information in the $K_2$ levels of data storage unit information.

$M_{k1}$ represents a quantity of pieces of data storage unit information included in the level k data storage unit information in the K levels of data storage unit information in the data storage unit information of the primary column family of the first partition. For example, $M_{01}=2$ indicates that level 0 data storage unit information of the primary column family of the first partition includes two pieces of data storage unit information. $M_{k2}$ represents a quantity of pieces of data storage unit information included in the level k data storage unit information in the K levels of data storage unit information in the data storage unit information of the primary column family of the second partition. For example, $M_{02}=2$ indicates that level 0 data storage unit information of the primary column family of the second partition includes two pieces of data storage unit information. A quantity of pieces of data storage unit information included in the level k data storage unit information in the data storage unit information of the primary column family of the third partition is a sum of $M_{k1}$ and $M_{k2}$. For example, assuming that $M_{01}=2$ and $M_{02}=2$, level 0 data storage unit information of the primary column family of the third partition includes four pieces of data storage unit information.

In the example of the KVDB using the LSM-tree algorithm, SSTable information stored in a manifest file corresponds to K levels of SSTable information. The following describes merging of the data storage unit information of the primary column family with reference to Table 6, Table 7, and Table 8.

TABLE 6

| Column family identifier | Level identifier | SSTable identifier | SSTable time sequence number | SSTable size | Minimum entry key value of an SSTable | Maximum entry key value of an SSTable |
|---|---|---|---|---|---|---|
| Primary column family | 0 | f1.0.1 | 0 | 30 MB | A1 | B9 |
| Primary column family | 0 | f1.0.2 | 1 | 30 MB | A11 | B21 |
| Primary column family | 1 | f1.1.1 | 3 | 2 MB | A1 | B1 |
| Primary column family | 1 | f1.1.2 | 4 | 2 MB | B2 | B23 |

Table 6 shows two levels of data storage unit information included in the data storage unit information of the primary column family of the first partition, and each level of data storage unit information in the two levels of data storage unit information includes two pieces of data storage unit information. Table 6 is a table obtained in the example of the KVDB using the LSM-tree algorithm. Therefore, correspondingly, the data storage unit information may also be referred to as SSTable information.

TABLE 7

| Column family identifier | Level identifier | SSTable identifier | SSTable time sequence number | SSTable size | Minimum entry key value of an SSTTable | Maximum entry key value of an SSTTable |
|---|---|---|---|---|---|---|
| Primary column family | 0 | f2.0.1 | 0 | 30 MB | C1 | F2 |
| Primary column family | 0 | f2.0.2 | 1 | 30 MB | D1 | E1 |
| Primary column family | 1 | f2.1.1 | 2 | 2 MB | C1 | C9 |
| Primary column family | 1 | f2.1.2 | 4 | 2 MB | C10 | D10 |

Table 7 shows two levels of data storage unit information included in the data storage unit information of the primary column family of the second partition, and each level of data storage unit information in the two levels of data storage unit information includes two pieces of data storage unit information. Table 7 is a table obtained in the example of the KVDB using the LSM-tree algorithm. Therefore, correspondingly, the data storage unit information may also be referred to as SSTable information.

TABLE 8

| Column family identifier | Level identifier | SSTable identifier | SSTable time sequence number | SSTable size | Minimum entry key value of an SSTTable | Maximum entry key value of an SSTTable |
|---|---|---|---|---|---|---|
| Primary column family | 0 | f1.0.1 | 0 | 30 MB | A1 | B9 |
| Primary column family | 0 | f1.0.2 | 1 | 30 MB | A11 | B21 |
| Primary column family | 0 | f2.0.1 | 0 | 30 MB | C1 | F2 |
| Primary column family | 0 | f2.0.2 | 1 | 30 MB | D1 | E1 |

TABLE 8-continued

| Column family identifier | Level identifier | SSTable identifier | SSTable time sequence number | SSTable size | Minimum entry key value of an SSTTable | Maximum entry key value of an SSTTable |
|---|---|---|---|---|---|---|
| Primary column family | 1 | f1.1.1 | 3 | 2 MB | A1 | B1 |
| Primary column family | 1 | f1.1.2 | 4 | 2 MB | B2 | B23 |
| Primary column family | 1 | f2.1.1 | 2 | 2 MB | C1 | C9 |
| Primary column family | 1 | f2.1.2 | 4 | 2 MB | C10 | D10 |

Table 8 shows two levels of data storage unit information included in the data storage unit information of the primary column family of the third partition, and each level of data storage unit information in the two levels of data storage unit information includes four pieces of data storage unit information. Table 8 is a table obtained in the example of the KVDB using the LSM-tree algorithm. Therefore, correspondingly, the data storage unit information may also be referred to as SSTable information. It can be learned that the level 0 SSTable information shown in Table 8 includes the level 0 SSTable information shown in Table 6 and Table 7, and the level 1 SSTable information shown in Table 8 includes the level 1 SSTable information shown in Table 6 and Table 7.

Both the data storage unit information of the primary column family of the first partition and the data storage unit information of the primary column family of the second partition are ordered sequences prefixed with partition key values. Because partitions are obtained by division based on range partitions, all key values between levels of storage unit information of the primary column families of the two partitions do not overlap in range. Therefore, each level of data storage unit information of the second partition may be directly appended to a same level of data storage unit information of the first partition, to form data storage unit information of a primary column family of a partition. For ease of description, this merging manner in which a level of data storage unit information of a partition is directly appended to a same level of data storage unit information of another partition is referred to as append merging below.

Similar to the data storage unit information of the secondary column family, a value of $K_1$ may also be different from a value of $K_2$. When the value of $K_1$ is different from the value of $K_2$, in addition to the K levels of data storage unit information, the data storage unit information included in the third partition may further include K' levels of data storage units, where a value of K' is $max(K_1, K_2)-min(K_1, K_2)$, $max(K_1, K_2)$ represents a maximum value in $K_1$ and $K_2$, and $min(K_1, K_2)$ represents a minimum value in $K_1$ and $K_2$. That is, K' is equal to the maximum value in $K_1$ and $K_2$ minus the minimum value in $K_1$ and $K_2$. Alternatively, the value of K' is $|K_1-K_2|$, that is, the value of K' is an absolute value of a difference between $K_1$ and $K_2$. If $K_1$ is greater than $K_2$, the K' levels of data storage units are the last K' levels of data storage unit information in the $K_1$ levels of data storage unit information of the first partition. If $K_2$ is greater than $K_1$, the K' levels of data storage units are the last K' levels of data storage unit information in the $K_2$ levels of data storage unit information of the first partition.

For example, assuming that $K_1=3$ and $K_2=2$, in this case, K=2, and K'=1. In this case, the manifest file of the first partition includes three levels of SSTable information of the primary column family: level 0 SSTable information to level 2 SStable information. The manifest file of the second partition includes two levels of SSTable information of the primary column family: level 0 SSTable information and level 1 SStable information. The target manifest file includes three levels of SSTable information of the primary column family: level 0 SSTable information to level 2 SStable information.

The level 0 SSTable information in the target manifest file includes the level 0 SSTable information of the primary column family in the manifest file of the first partition and the level 0 SSTable information of the primary column family in the manifest file of the second partition.

The level 1 SSTable information in the target manifest file includes the level 1 SSTable information of the primary column family in the manifest file of the first partition and the level 1 SSTable information of the primary column family in the manifest file of the second partition.

The level 2 SSTable information in the target manifest file includes the level 2 SSTable information of the primary column family in the manifest file of the first partition.

A sequence of data storage unit information of a primary/secondary column family from a same partition in data storage unit information of a primary/secondary column family obtained by merging does not change.

Data storage unit information of a primary column family is used as an example. As shown in Table 6, Table 7, and Table 8, SSTable f1.1.1 is located ahead of SSTable f1.1.2 before merging, and SSTable f1.1.1 is still located ahead of SSTable f1.1.2 after the merging. As shown in Table 8, in the data storage unit information of the primary column family of the third partition, a sequence of level 1 SSTable of the data storage unit information of the primary column family from the first partition and level 1 SSTable of the data storage unit information of the primary column family from the second partition is: SSTable f1.1.1, SSTable f1.1.2, SSTable f2.1.1, and SSTable f2.1.2. In some embodiments, it is only required that a sequence of data storage unit information of primary column families in a same partition does not change. That is, data storage unit information of a primary column family from another partition may be located ahead of the data storage unit information of the primary column family of the same partition after merging. For example, the data storage unit information of the primary column family of the third partition may alternatively be shown in Table 9.

TABLE 9

| Column family identifier | Level identifier | SSTable identifier | SSTable time sequence number | SSTable size | Minimum entry key value of an SSTable | Maximum entry key value of an SSTable |
| --- | --- | --- | --- | --- | --- | --- |
| Primary column family | 0 | f1.0.1 | 0 | 30 MB | A1 | B9 |
| Primary column family | 0 | f1.0.2 | 1 | 30 MB | A11 | B21 |
| Primary column family | 0 | f2.0.1 | 0 | 30 MB | C1 | F2 |
| Primary column family | 0 | f2.0.2 | 1 | 30 MB | D1 | E1 |
| Primary column family | 1 | f1.1.1 | 3 | 2 MB | A1 | B1 |
| Primary column family | 1 | f2.1.1 | 2 | 2 MB | C1 | C9 |
| Primary column family | 1 | f1.1.2 | 4 | 2 MB | B2 | B23 |
| Primary column family | 1 | f2.1.2 | 4 | 2 MB | C10 | D10 |

As shown in Table 9, in the data storage unit information of the primary column family of the third partition, a sequence of level 1 SSTable of the data storage unit information of the primary column family from the first partition and level 1 SSTable of the data storage unit information of the primary column family from the second partition is: SSTable f1.1.1, SSTable f2.1.1, SSTable f1.1.2, and SSTable f2.1.2. It can be learned that although SSTable f2.1.1 is located between SSTable f1.1.1 and SSTable f1.1.2, SSTable f1.1.1 is still located ahead of SSTable f1.1.2.

A sequence of data storage unit information of the secondary column families is similar to the sequence of the data storage unit information of the primary column families, and details are not described herein again.

The metadata of the first partition further includes a write-ahead logging information set of the first partition. The metadata of the second partition includes a write-ahead logging information set of the second partition.

The database server 1 may merge the write-ahead logging information set of the first partition and the write-ahead logging information set of the second partition, to generate a write-ahead logging information set of the third partition.

The write-ahead logging information set of the third partition includes N pieces of write-ahead logging information, the write-ahead logging information set of the first partition includes $N_1$ pieces of write-ahead logging information in the N pieces of write-ahead logging information, and the write-ahead logging information set of the second partition includes $N_2$ pieces of write-ahead logging information in the N pieces of write-ahead logging information, where N is a positive integer greater than or equal to 2, $N_1$ and $N_2$ are positive integers greater than or equal to 1, and a sum of $N_1$ and $N_2$ is N.

That is, in the foregoing embodiment, the database server 1 only merges write-ahead logging information included in a first write-ahead logging information set in the metadata of the first partition and write-ahead logging information included in a second write-ahead logging information set in the metadata of the second partition into a third write-ahead logging information set in the metadata of the third partition. The database server 1 does not read, from the first partition, $N_1$ write-ahead logs indicated by the $N_1$ pieces of write-ahead logging information in the first write-ahead logging information set, and does not write the $N_1$ write-ahead logs into a partition obtained by merging. That is, in a partition merging process, only write-ahead logging information in metadata information needs to be merged, and a read/write operation does not need to be performed on a write-ahead log indicated by the write-ahead logging information. The write-ahead logging information may include an identifier of the write-ahead log and a time sequence number of the write-ahead log. Therefore, a size of the write-ahead logging information is usually measured in an order of magnitude of kilobytes (KB). However, a size of the write-ahead log is usually measured in an order of magnitude of MB. Therefore, compared with reading and writing of the write-ahead log, reading and writing of the write-ahead logging information may reduce data read/write operations, to reduce overheads of a distributed database system.

Still in the example of the KVDB using the LSM-tree algorithm, the write-ahead logging information may be WAL file information stored in the manifest file. As described above, the WAL file information includes an identifier of a WAL file. Optionally, the WAL file information may further include a time sequence number of the WAL file. For example, the WAL file information includes the identifier of the WAL file and the time sequence number of the WAL file. The write-ahead logging information set of the first partition may include identifiers of $N_1$ WAL files and a time sequence number of each of the $N_1$ WAL files, and the write-ahead logging information set of the second partition may include identifiers of $N_2$ WAL files and a time sequence number of each of the $N_2$ WAL files. The write-ahead logging information set of the third partition may include the identifiers of $N_1$ WAL files and the time sequence number of each of the $N_1$ WAL files, and the write-ahead logging information set of the third partition may further include the identifiers of $N_2$ WAL files and the time sequence number of each of the $N_2$ WAL files.

In some embodiments, a sequence of first write-ahead logging information and second write-ahead logging information in the first write-ahead logging information set is the same as a sequence of the first write-ahead logging information and the second write-ahead logging information in the third write-ahead logging information set. The first write-ahead logging information and the second write-ahead logging information are any two pieces of write-ahead logging information of the $N_1$ write-ahead logs included in the write-ahead logging information set of the first partition. That is, in the write-ahead logging information set of the first partition, if the first write-ahead logging information is ahead of the second write-ahead logging information, the first write-ahead logging information is still ahead of the second write-ahead logging information in the write-ahead logging information set of the third partition.

Similarly, a sequence of third write-ahead logging information and fourth write-ahead logging information in the write-ahead logging information set of the second partition is the same as a sequence of the third write-ahead logging information and the fourth write-ahead logging information in the write-ahead logging information set of the third partition. The third write-ahead logging information and the fourth write-ahead logging information are any two pieces of write-ahead logging information of the $N_2$ write-ahead logs included in the write-ahead logging information set of the second partition. That is, in the write-ahead logging information set of the second partition, if the third write-ahead logging information is ahead of the fourth write-ahead logging information, the third write-ahead logging information is still ahead of the fourth write-ahead logging information in the write-ahead logging information set of the third partition.

Table 10 shows an example of merging WAL file information in two manifest files.

TABLE 10

| First partition | Second partition | Third partition |
|---|---|---|
| f1.w.9, f1.w.8 | f2.w.11, f2.w.7 | f1.w.9, f2.w.11, f1.w.8, and f2.w.7 |

In Table 10, identifiers of WAL files represent WAL file information, and a sequence of the identifiers of the WAL files is used to identify time sequence numbers of the WAL files. The identifiers of the WAL files shown in Table 10 are sorted according to time sequence numbers of the WAL files, and a right time sequence number of an identifier of a WAL file is less than a left time sequence number of an identifier of a WAL file.

As shown in Table 10, a manifest file 1 of the first partition includes information about two WAL files, identifiers of the two WAL files are f1.w.8 and f1.w.9, and a time sequence number of the f1.w.8 is less than a time sequence number of the f1.w.9. A manifest file 2 of the second partition includes information about two WAL files, identifiers of the two WAL files are f1.w.7 and f1.w.11, and a time sequence number of the f1.w.7 is less than a time sequence number of the f1.w.11.

It can be learned from Table 10 that, after the two pieces of WAL file information in the first partition and the two pieces of WAL file information in the second partition are merged, WAL file information in a manifest file 3 of the third partition is obtained. The manifest file 3 includes four pieces of WAL file information. The four pieces of WAL file information are respectively from the manifest file 1 and the manifest file 2. In addition, it can be further learned from Table 10 that a sequence of the two pieces of WAL file information from the manifest file 1 does not change, and the f1.w.8 is ahead of the f1.w.9. Similarly, a sequence of the two pieces of WAL file information from the manifest file 2 does not change, and the f2.w.7 is ahead of the f1.w.11.

311. The database server 1 sends response information to the management server, where the response information includes an identifier of the current file of the third partition.

312. The management server updates the partition routing table.

Further, the management server marks the first partition and the second partition as deleted, records left and right boundaries of the third partition and the identifier of the current file, and modifies a state of the third partition to normal. The partition routing table includes a mapping relationship between the third partition and the database server 1. A specific implementation may be a mapping relationship between an identifier of the third partition and an address of the database server.

313. The management server sends a partition complete message to the database server 1 and the database server 2, where the partition complete message is used to indicate that merging of the first partition and the second partition is completed.

The metadata of the third partition includes the metadata of the first partition and the metadata of the second partition. In the example of the KVDB using the LSM-tree algorithm, a storage server stores WAL files, SSTables, and manifest files of corresponding partitions. Therefore, in the partition merging solution provided in this embodiment of this application, the database server 1 can access, based on the metadata of the third partition, a WAL file, an SSTable, and a manifest file, of a corresponding partition of the first partition and the second partition, stored in the storage server, and the first partition and the second partition can be merged without a need to perform read and write operations on a data entry in the first partition and a data entry in the second partition. This reduces data read/write operations and improves a partition merging speed in the partition merging process. In addition, in a process of merging two partitions, service write operations on the two partitions are temporarily frozen until partition merging is completed. In this embodiment of this application, a time of freezing the service write operations on the partitions is also reduced.

314. The database server 1 closes a database of the first partition, deletes the current file of the first partition and the metadata of the first partition, sends a success response to the management server, and returns a rerouting error response for the suspended write request, and after receiving the rerouting error response message, a client initiates a request to the management server to update the partition routing table, and then sends the request to a new home database server.

315. The database server 2 closes a database of the second partition, deletes the current file of the second partition and the metadata of the second partition, sends a success response to the management server, and returns a rerouting error response for the suspended write request, and after receiving the rerouting error response message, the client initiates a request to the management server to update the partition routing table, and then sends the request to a new home database server.

316. The management server updates the partition routing table, and deletes records of the first partition and the second partition.

317. The database server 1 starts a level compaction task in background, to reduce a quantity of levels in the metadata of the third partition. Before the merging is completed, the third partition does not participate in new partition merging.

As describe above, in some embodiments, the database server 1 may determine the data storage unit information of the secondary column family of the third partition based on the data storage unit information of the target column family. The data storage unit information of the secondary column family of the third partition includes P levels of data storage unit information, level 1 data storage unit information in the P levels of data unit storage information in the data storage unit information of the secondary column family of the third partition is data storage unit information of a data storage unit that is obtained after data storage units corresponding to the level 0 data storage unit information in the Q levels of data storage unit information are merged and resorted, and each of level 2 to level (P−1) data storage unit information in the P levels of data unit storage information in the data storage unit information of the secondary column family of the third partition is data storage unit information of a data storage unit that is obtained after data storage units corresponding to at least two levels of data storage unit information in level 1 data storage unit information to level (Q−1) data storage unit information in the Q levels of data storage unit information are merged and resorted.

A process in which the database server 1 determines the data storage unit information of the secondary column family of the third partition based on the data storage unit information of the target column family may be referred to as a level compaction process.

Figure 4A:
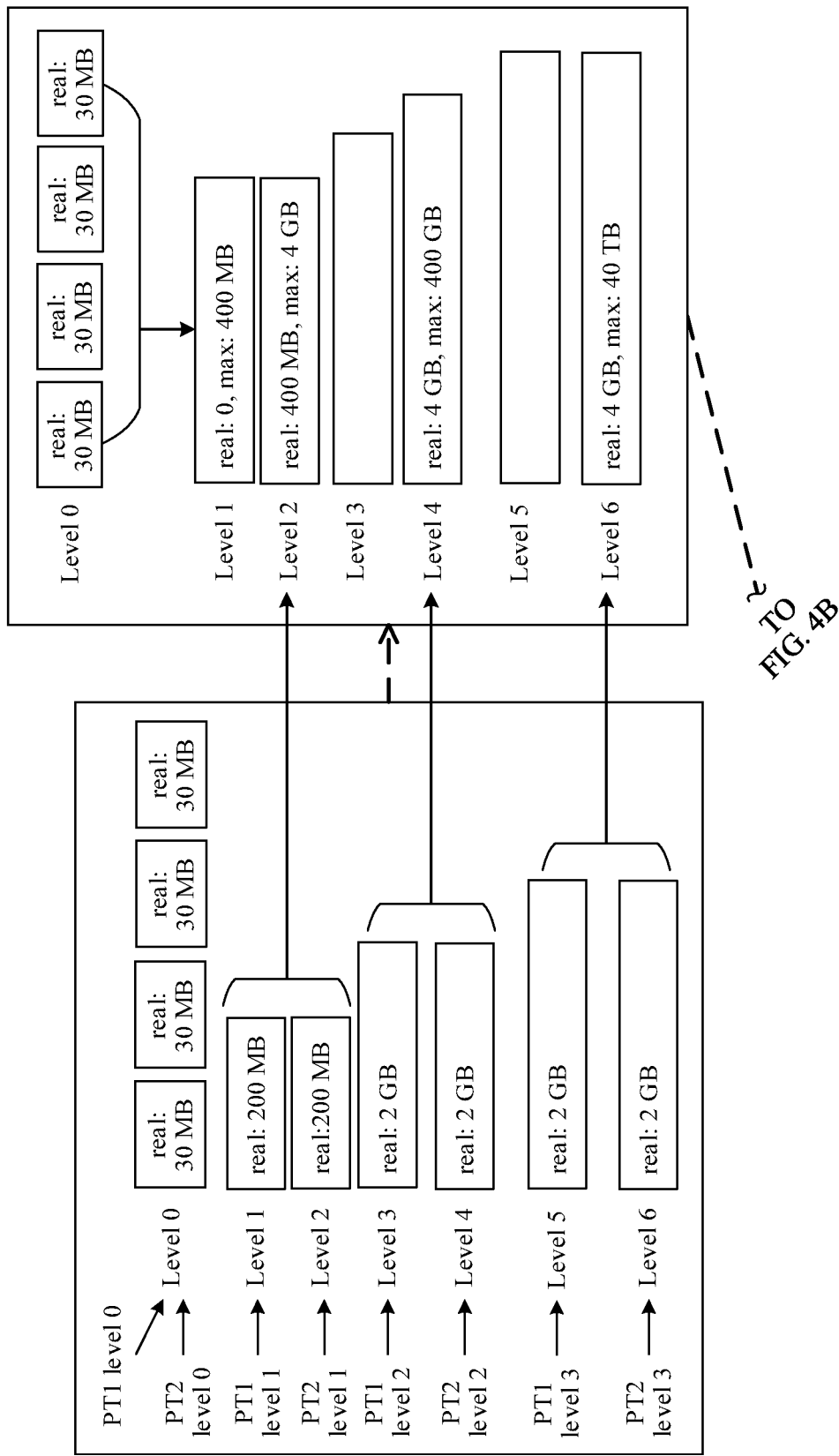
FIG. 4A and FIG. 4B are a schematic diagram of a level compaction process.
Figure 4B:
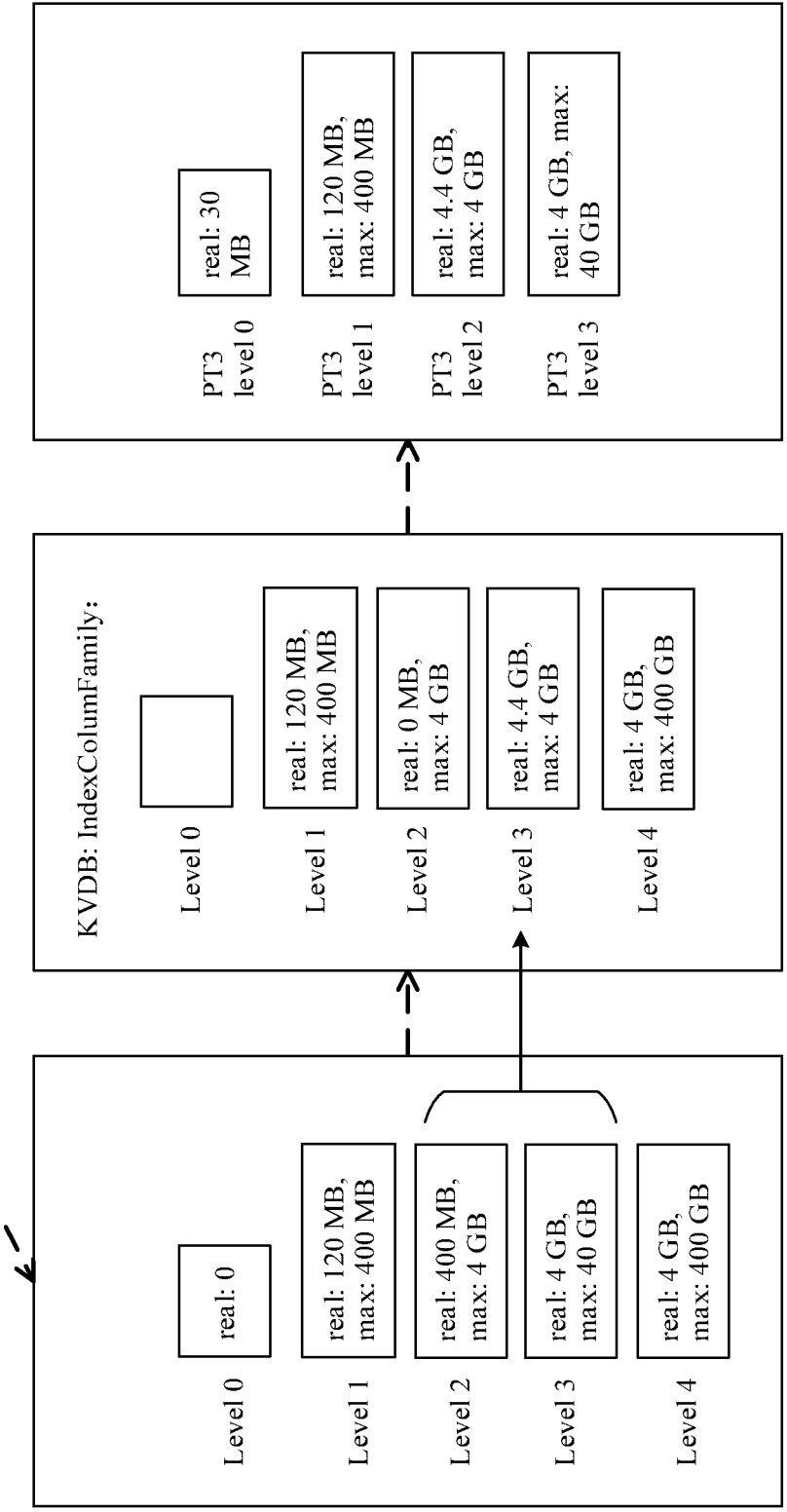

The following describes the level compaction process with reference to FIG. 4A and FIG. 4B.

As shown in FIG. 4A and FIG. 4B, PT1 level 0 represents the level 0 data storage unit information in the data storage unit information of the secondary column family of the first partition, PT2 level 0 represents the level 0 data storage unit information in the data storage unit information of the secondary column family of the second partition, PT3 level 0 represents the level 0 data storage unit information in the data storage unit information of the secondary column family of the third partition, and so on. Level 0 represents level 0 data storage unit information in a process of obtaining the data storage unit information of the secondary column family of the third partition based on the data storage unit information of the secondary column family of the first partition and the data storage unit information of the secondary column family of the second partition, level 1 represents level 1 data storage unit information in the process of obtaining the data storage unit information of the secondary column family of the third partition based on the data storage unit information of the secondary column family of the first partition and the data storage unit information of the secondary column family of the second partition, and so on. Real: 30 MB indicates that an actual data volume at a current level is 30 MB, and max: 400 MB indicates that a specified maximum data volume at the level is 400 MB.

Append merging is performed on the level 0 data storage unit information in the data storage unit information of the secondary column family of the first partition and the level 0 data storage unit information in the data storage unit information of the secondary column family of the second partition, to obtain level 0 data storage unit information in the data storage unit information of the target secondary column family. Stack merging is performed on level 1 to level 3 data storage unit information in the data storage unit information of the secondary column family of the first partition and level 1 to level 3 data storage unit information in the data storage unit information of the secondary column family of the second partition, to obtain level 1 to level 6 data storage unit information in the data storage unit information of the target secondary column family.

As shown in FIG. 4A and FIG. 4B, the level 0 data storage unit information in the data storage unit information of the target secondary column family includes the level 0 data storage unit information in the data storage unit information of the secondary column family of the first partition and the level 0 data storage unit information in the data storage unit information of the secondary column family of the second partition.

The level 1 data storage unit information in the data storage unit information of the target secondary column family includes the level 1 data storage unit information in the data storage unit information of the secondary column family of the first partition.

The level 2 data storage unit information in the data storage unit information of the target secondary column family includes the level 1 data storage unit information in the data storage unit information of the secondary column family of the second partition.

The level 3 data storage unit information in the data storage unit information of the target secondary column family includes the level 2 data storage unit information in the data storage unit information of the secondary column family of the first partition.

The level 4 data storage unit information in the data storage unit information of the target secondary column family includes the level 2 data storage unit information in the data storage unit information of the secondary column family of the second partition.

The level 5 data storage unit information in the data storage unit information of the target secondary column family includes the level 3 data storage unit information in the data storage unit information of the secondary column family of the first partition.

The level 6 data storage unit information in the data storage unit information of the target secondary column family includes the level 3 data storage unit information in the data storage unit information of the secondary column family of the second partition.

For ease of description, unless otherwise specified, the level 1 data storage unit information described below is the level 1 data storage unit information of the data storage unit information of the target secondary column family. Similarly, the level 2 data storage unit information is the level 2 data storage unit information of the data storage unit information of the target secondary column family, and so on.

For ease of description, the KVDB using the LSM-tree algorithm is further used as an example for description. Correspondingly, the data storage unit information is SSTable information.

First, merge sorting is described. It is assumed that an SSTable 1 stores the following content: {Key01-Value, Key10-Value, Key19-Value}. It is assumed that an SSTable 2 stores the following content: {Key08-Value, Key12-Value, Key17-Value}. It is not important whether data in the values is the same, because the content is sorted according to the keys.

A merge sorting process is as follows:

(1) Apply for first space, and read the content from the SSTable 1 and the SSTable 2 to the first space.

(2) Apply for second space, where a size of the second space is a total size of the SSTable 1 and the SSTable 2, and the second space is used to store SSTable content obtained by compaction.

(3) Set two pointers, where initial positions of the two pointers are respectively starting data entries of the SSTable 1 and the SSTable 2.

(4) Compare data entries in the SSTable 1 and the SSTable 2 to which the two pointers point, select a data entry with a smaller entry key value, put the data entry into the second space, and move the pointers to next positions, where data entries stored in the second space are an SSTable obtained by compaction.

(5) Repeat step 4 until a pointer points to the last data entry in one of the SSTable 1 and the SSTable 2.

(6) Directly copy all remaining data entries in the other SSTable to the end of the SSTable obtained by compaction.

(7) Obtain sorted content as follows: {Key01-Value, Key08-Value, Key10-Value, Key12-Value, Key17-Value, Key19-Value}.

(8) Write the foregoing content into two new SSTables: an SSTable 3 and an SSTable 4:

SSTable 3: {Key01-Value, Key08-Value, Key10-Value}, and

SSTable 4: {Key12-Value, Key17-Value, Key19-Value}.

A level compaction process includes the following steps:

Step 1: After being merged and sorted, all SSTables indicated by level 1 SSTable information and all SSTables indicated by level 2 SSTable information are written into a new SSTable, SSTable information corresponding to the newly added level 2 SSTable is recorded in a manifest file, and at the same time, the original level 1 and level 2 SSTable information and SSTable tags indicated by the original level 1 and level 2 SSTable information are deleted. Assuming that all SSTables indicated by the level 1 SSTable information and all SSTables indicated by the level 2 SSTable information shown in FIG. 4A and FIG. 4B need to be read/written, a total amount of to-be-read/written data is 200 MB×2.

Further, it is assumed that Table 11 is an example of the level 1 SSTable information and the level 2 SSTable information.

TABLE 11

| Column family identifier | Level identifier | SSTable identifier | SSTable size | Minimum entry key value of an SSTable | Maximum entry key value of an SSTable |
| --- | --- | --- | --- | --- | --- |
| Secondary column family | 1 | f1a.1.1 | 2 MB | {15, A1} | {15, B1} |
| Secondary column family | 1 | f1a.1.2 | 2 MB | {15, B2} | {15, B23} |
| Secondary column family | 2 | f2a.1.1 | 2 MB | {15, C1} | {15, C9} |
| Secondary column family | 2 | f2a.1.2 | 2 MB | {15, C10} | {15, D10} |

It should be noted that, because a time sequence number is meaningless for the level 1 and a higher level, Table 11 and Table 12 do not include the time sequence number.

As shown in Table 11, SSTables corresponding to the level 1 SSTable information are f1a.1.1 and f1a.1.2, and SSTables corresponding to the level 2 SSTable information are f2a.1.1 and f2a.1.2. New SSTables f3a.1.1 and f3a.1.2 are created, and content of the SSTables f1a.1.1 and f2a.1.1 is merged and sorted, and then written into the newly created SSTables f3a.1.1 and the f3a.1.2 (for details, refer to the merge sorting example). Similarly, new SSTables f3a.1.3 and f3a.1.4 are created, content of the SSTables f1a.1.2 and f2a.2.2 is merged and sorted, and then written into the newly created SSTables f3a.1.3 and f3a.1.4. The manifest file records SSTable information corresponding to the newly added SSTables. In this case, the SSTable information recorded in the manifest file may be shown in Table 12.

TABLE 12

| Column family identifier | Level identifier | SSTable identifier | SSTable size | Minimum entry key value of an SSTable | Maximum entry key value of an SSTable |
| --- | --- | --- | --- | --- | --- |
| Secondary column family | 2 | f3a.1.1 | 2 MB | {15, A1} | {15, B1} |
| Secondary column family | 2 | f3a.1.2 | 2 MB | {15, B2} | {15, B23} |
| Secondary column family | 2 | f3a.1.3 | 2 MB | {15, C1} | {15, C9} |
| Secondary column family | 2 | f3a.1.4 | 2 MB | {15, C10} | {15, D10} |

As shown in Table 12, the manifest file includes only newly created SSTable information, and the original level 1 and level 2 SSTable information have been deleted. Correspondingly, the SSTables indicated by the original level 1 and level 2 SSTable information are also deleted.

After the foregoing compaction process, there is no data at the level 1, and data at the level 2 is doubled.

In the foregoing example, all the SSTables indicated by the level 1 SSTable information overlap all the SSTables indicated by the level 2 SSTable information. Therefore, a new SSTable needs to be written after resorting. When two ranges of to-be-merged SSTables do not overlap, content of the SSTable does not need to be rewritten.

Step 2: After being merged and sorted, level 0 SSTables are written into a new SSTable, and SSTable information corresponding to the newly added SSTable is recorded in the manifest file, where a level identifier in the SSTable information corresponding to the newly added SSTable is 1. A specific merge sorting process is similar to that in step 1, and details are not described herein again. Assuming that all SSTables indicated by the level 0 SSTable information shown in FIG. 4A and FIG. 4B need to be read/written, a total amount of to-be-read/written data is 30 MB×4.

Step 3: After being merged and sorted, all SSTables indicated by level 3 SSTable information and all SSTables indicated by level 4 SSTable information are written into a new SSTable, SSTable information corresponding to the newly added level 4 SSTable is recorded in the manifest file, and at the same time, the original level 3 and level 4 SSTable information and SSTable tags indicated by the original level 3 and level 4 SSTable information are deleted. A read-only identifier is added to the level 3, and no new SSTable is written into a level 3. Assuming that all the SSTables indicated by the level 3 SSTable information and all the SSTables indicated by the level 4 SSTable information shown in FIG. 4A and FIG. 4B need to be read/written, a total amount of to-be-read/written data is 2 gigabytes (GB)×2.

Step 4: After being merged and sorted, all SSTables indicated by level 5 SSTable information and all SSTables indicated by level 6 SSTable information are written into a new SSTable, SSTable information corresponding to the newly added level 6 SSTable is recorded in the manifest file, and at the same time, the original level 5 and level 6 SSTable information and SSTable tags indicated by the original level 5 and level 6 SSTable information are deleted. A read-only identifier is added to the level 5, and no new SSTable is written into a level 5. Assuming that all the SSTables indicated by the level 5 SSTable information and all the SSTables indicated by the level 6 SSTable information shown in FIG. 4A and FIG. 4B need to be read/written, a total amount of to-be-read/written data is 2 GB×2.

Step 5: Delete level 3 and level 5. Specific operations are as follows: A level identifier of SSTable information whose level identifier is 4 in the manifest file is modified to 3, and a level identifier of SSTable information whose level identifier is 6 in the manifest file is modified to 4, to delete the original level 3 and the original level 5.

Step 6: After being merged and sorted, all SSTables indicated by the new level 2 (that is, the level 2 obtained in step 1) SSTable information and all SSTables indicated by the new level 3 (that is, the level 3 obtained in step 5) SSTable information are written into a new SSTable, SSTable information corresponding to the SSTable newly added to the new level 3 is recorded in the manifest file, and at the same time, the original SSTable information and SSTable tags indicated by the original SSTable information at the new level 2 and the new level 3 are deleted. The new level 2 is deleted, a level identifier of SSTable information whose level identifier is 3 in the manifest file is modified to 2, and a level identifier of SSTable information whose level identifier is 4 in the manifest file is modified to 3. Assuming that all the SSTables indicated by new level 2 (that is, the level 2 obtained in step 1) SSTable information shown in FIG. 4A and FIG. 4B and the new level 3 (that is, the level 2 obtained in step 5) SSTable information need to be read/written, a total amount of to-be-read/written data is 400 MB+4 GB.

The data storage unit information of the secondary column family and data storage units corresponding to the data storage unit information of the third secondary column family are obtained through step 1 to step 6.

It may be understood that step 1, step 2, step 3, step 4, step 5, and step 6 are merely used to facilitate distinguishing between different steps, but are not intended to limit a sequence of the steps. It can be learned from the foregoing descriptions of the six steps that a sequence of step 1, step 3, and step 4 may change.

By performing level compaction, a quantity of levels of a data storage unit can be reduced, and this can facilitate querying for a data entry stored in the database.

Certainly, in some embodiments, alternatively, the database server 1 may not perform level compaction.

The distributed database system provided in this embodiment of this application may be used to store metadata of a distributed object storage system, metadata of a distributed file system, or metadata of a distributed block storage system.

Figure 5:
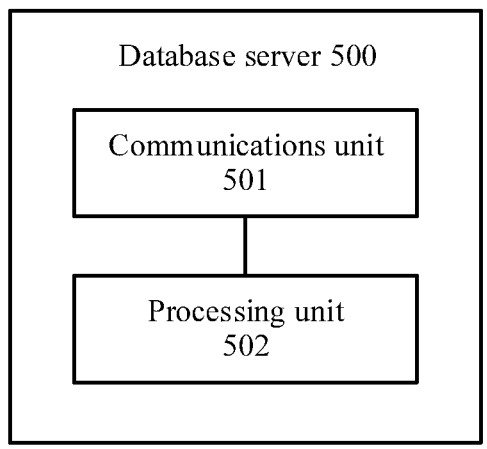
FIG. 5 is a structural block diagram of a database server according to an embodiment of this application.

FIG. 5 is a structural block diagram of a database server according to an embodiment of this application. As shown in FIG. 5, the database server 500 includes a communications unit 501 and a processing unit 502.

The communications unit 501 is configured to receive a merging instruction sent by a management server, where the merging instruction is used to merge a first partition and a second partition into a third partition, the first partition and the second partition are adjacent partitions, the merging instruction includes an identifier of a current file of the first partition and an identifier of a current file of the second partition, the current file of the first partition records a file identifier of a file that stores metadata of the first partition, the current file of the second partition records a file identifier of a file that stores metadata of the second partition, the first partition is run on the database server, and the second partition is run on another database server.

The processing unit 502 is configured to obtain the metadata of the first partition based on the identifier of the current file of the first partition, obtain the metadata of the second partition based on the identifier of the current file of the second partition, and merge the metadata of the first partition and the metadata of the second partition, to generate metadata of the third partition.

In another implementation of the database server 500 shown in FIG. 5, the communications unit 501 is configured to receive a merging instruction sent by a management server, where the merging instruction is used to merge the first partition and the second partition into the third partition, and the first partition and the second partition are adjacent partitions. The processing unit 502 is configured to obtain the metadata of the first partition and the metadata of the second partition based on the first partition, and merge the metadata of the first partition and the metadata of the second partition to generate the metadata of the third partition.

The database server 500 shown in FIG. 5 may perform the steps performed by the database server 1 shown in FIG. 3A and FIG. 3B. For specific functions and beneficial effects of the units in the database server 500 shown in FIG. 5, refer to the method shown in FIG. 3A and FIG. 3B. Details are not described herein again.

In a possible implementation, the processing unit 502 may be implemented by a processor, and the communications unit 501 may be implemented by a network interface card. In some other embodiments, the communications unit 501 may alternatively be implemented using a bus adapter. The communications unit 501 may support one or more access protocols, for example, an Ethernet packet protocol and an InfiniBand protocol. This is not limited in this embodiment of the present disclosure. In another implementation, the communications unit 501 and the processing unit 502 may be implemented using software, or implemented using both software and hardware.

Figure 6:
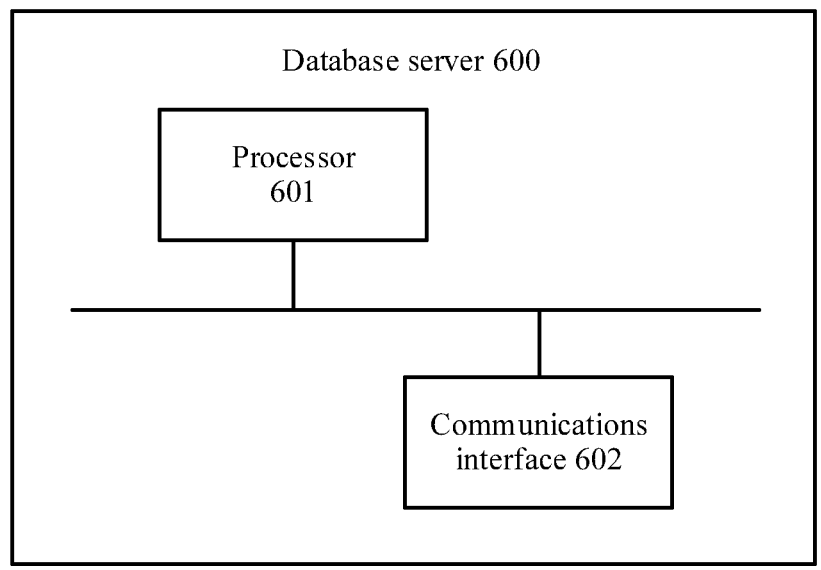
FIG. 6 is a structural block diagram of a database server according to an embodiment of the present disclosure.

FIG. 6 is a structural block diagram of a database server according to an embodiment of the present disclosure. As shown in FIG. 6, a database server 600 includes a processor 601 and a communications interface 602. The processor 601 may be configured to process data, control the database server, execute a software program, process data of the software program, and the like. The communications interface 602 is mainly configured to perform communication, for example, communicate with a management server in a distributed database system.

In this embodiment of this application, a circuit having receiving and transmitting functions may be considered as the communications interface 602 of the database server, and a processor having a processing function may be considered as the processor 601 of the database server 600. In some embodiments, the communications interface 602 may be implemented by a network interface card. In some other embodiments, the communications interface 602 may alternatively be implemented using a bus adapter. The communications interface 602 may support one or more access protocols, for example, an Ethernet packet protocol and an InfiniBand protocol. This is not limited in this embodiment of the present disclosure. The processing unit may also be referred to as a processor, a processing board, a processing module, a processing apparatus, or the like.

The processor 601 and the communications interface 602 communicate with each other, and transmit a control signal and/or a data signal using an internal connection path.

The methods disclosed in the foregoing embodiments of the present disclosure may be applied to the processor 601, or implemented by the processor 601. The processor 601 may be an integrated circuit chip and has a signal processing capability. In an implementation process, steps in the foregoing method can be implemented using a hardware integrated logical circuit in the processor 601, or using instructions in a form of software.

The processor described in the embodiments of this application may be a general-purpose processor, a digital signal processor (DSP), an application-specific integrated circuit (ASIC), a field-programmable gate array (FPGA) or another programmable logic device, a discrete gate or transistor logic device, or a discrete hardware component. The processor may implement or perform the methods, the steps, and the logical block diagrams that are disclosed in the embodiments of the present disclosure. The general-purpose processor may be a microprocessor, or the processor may be any conventional processor or the like. Steps of the methods disclosed with reference to the embodiments of the present disclosure may be directly executed and completed using a hardware decoding processor, or may be executed and completed using a combination of hardware and software modules in a decoding processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads instructions in the memory and completes the steps in the foregoing methods in combination with hardware of the processor.

Optionally, in some embodiments, the processor 601 may be a combination of a central processing unit (CPU) and a memory. The memory may store an instruction used to perform the method performed by the database server 1 in the method shown in FIG. 3A and FIG. 3B. The CPU may execute the instruction stored in the memory, to complete, in combination with other hardware (for example, the communications interface 602), the steps performed by the database server 1 in the method shown in FIG. 3A and FIG. 3B. For a specific working process and a beneficial effect, refer to the descriptions in the embodiment shown in FIG. 3A and FIG. 3B.

An embodiment of this application further provides a chip. The chip includes a transceiver unit and a processing unit. The transceiver unit may be an input/output circuit or a communications interface. The processing unit is a processor, a microprocessor, or an integrated circuit integrated on the chip. The chip may perform the method performed by the database server 1 in the foregoing method embodiment.

An embodiment of this application further provides a computer readable storage medium. The computer readable storage medium stores a computer instruction, and when the computer instruction is executed, the method performed by the database server 1 in the foregoing method embodiment is performed.

An embodiment of this application further provides a computer program product including a computer instruction. When the computer instruction is executed, the method performed by the database server 1 in the foregoing method embodiment is performed.

Figure 7:
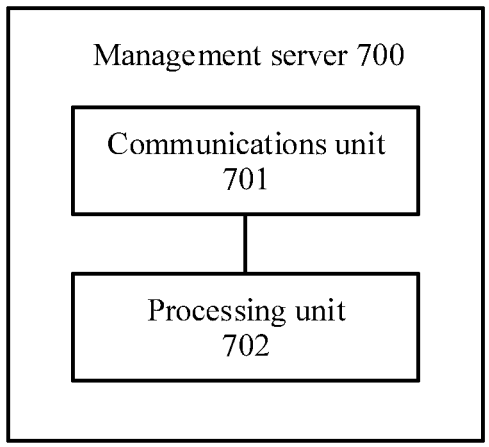
FIG. 7 is a structural block diagram of a management server according to an embodiment of this application.

FIG. 7 is a structural block diagram of a management server according to an embodiment of this application. As shown in FIG. 7, a management server 700 includes a communications unit 701 and a processing unit 702.

The processing unit 702 is configured to create a third partition, and determine to merge a first partition and a second partition into the third partition.

The communications unit 701 is configured to send a merging instruction to a first database server, where the merging instruction is used to merge the first partition and the second partition into the third partition, the first partition and the second partition are adjacent partitions, the merging instruction includes an identifier of a current file of the first partition and an identifier of a current file of the second partition, the current file of the first partition records a file identifier of a file that stores metadata of the first partition, the current file of the second partition records a file identifier of a file that stores metadata of the second partition, the first partition is run on the first database server, and the second partition is run on a second database server.

In another implementation of the management server 700, the processing unit 702 is configured to create the third partition, and determine to merge the first partition and the second partition into the third partition.

The communications unit 701 is configured to send a merging instruction to the first database server, where the merging instruction is used to merge the first partition and the second partition into the third partition, the first partition and the second partition are adjacent partitions, the first partition is run on the first database server, and the second partition is run on the second database server.

The management server 700 shown in FIG. 7 may perform the steps performed by the management server shown in FIG. 3A and FIG. 3B. For specific functions and beneficial effects of the units in the management server 700 shown in FIG. 7, refer to the method shown in FIG. 3A and FIG. 3B. Details are not described herein again.

In a possible implementation, the processing unit 702 may be implemented by a processor, and the communications unit 701 may be implemented by a network interface card. In some other embodiments, the communications unit 701 may alternatively be implemented using a bus adapter. The communications unit 701 may support one or more access protocols, for example, an Ethernet packet protocol and an InfiniBand protocol. This is not limited in this embodiment of the present disclosure.

Figure 8:
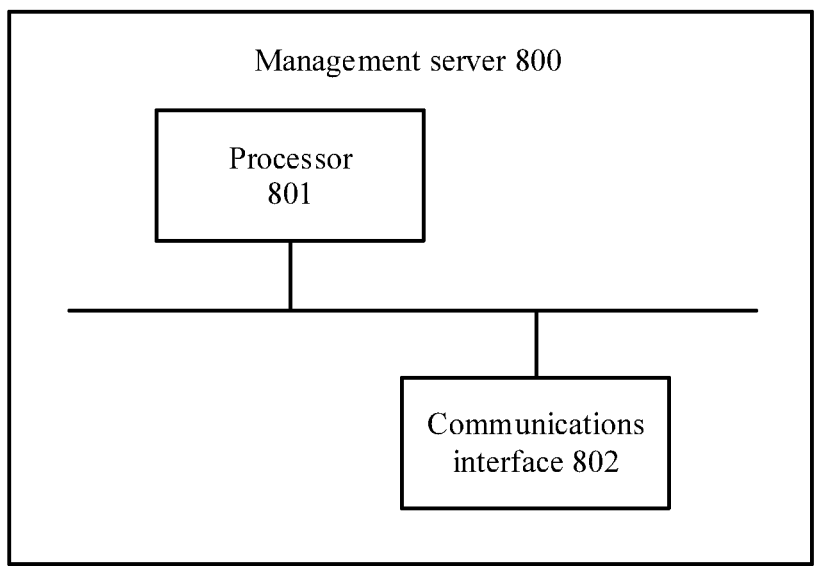
FIG. 8 is a structural block diagram of a management server according to an embodiment of the present disclosure.

FIG. 8 is a structural block diagram of a management server according to an embodiment of the present disclosure. As shown in FIG. 8, a management server 800 includes a processor 801 and a communications interface 802. The processor 801 may be configured to process data, control the management server 800, execute a software program, process data of the software program, and the like. In this embodiment of this application, a circuit having receiving and transmitting functions may be considered as the communications interface 802 of the management server, and a processor having a processing function may be considered as the processor 801 of the management server. For specific descriptions of the management server 800, refer to the descriptions of the database server 600. Details are not described herein again.

An embodiment of this application further provides a computer readable storage medium. The computer readable storage medium stores a computer instruction, and when the computer instruction is executed, the method performed by the management server in the foregoing method embodiment is performed.

An embodiment of this application further provides a computer program product including a computer instruction.

When the computer instruction is executed, the method performed by the management server in the foregoing method embodiment is performed.

A person skilled in the art may be aware that units and algorithm steps in the examples described with reference to the embodiments disclosed in this specification can be implemented by electronic hardware or a combination of computer software and electronic hardware. Whether the functions are performed by hardware or software depends on a particular application and a design constraint condition of a technical solution. A person skilled in the art can implement the described functions using different methods for each specific application.

It may be clearly understood by a person skilled in the art that, for the purpose of convenient and brief description, for a detailed working process of the foregoing system, apparatus, and unit, refer to a corresponding process in the foregoing method embodiments, and details are not described herein.

In the several embodiments provided in this application, it should be understood that, the disclosed system, apparatus, and method may be implemented in other manners. For example, the unit division is merely logical function division and may be other division in actual implementation. For example, a plurality of units or components may be combined or integrated into another system, or some features may be ignored or not performed. In addition, displayed or discussed mutual couplings or direct couplings or communication connections may be indirect couplings or communication connections using some interfaces, apparatuses, or units, and may have an electrical form, a mechanical form, or another form.

The units described as separate parts may or may not be physically separate, and parts displayed as units may or may not be physical units, that is, may be located in one position, or may be distributed on a plurality of network units. Some or all of the units may be selected based on actual requirements to achieve the objectives of the solutions in the embodiments.

In addition, functional units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer readable storage medium. Based on such an understanding, the technical solutions of this application essentially, or the part contributing to other approaches, or some of the technical solutions may be implemented in a form of a software product. The computer software product is stored in a storage medium, and includes several computer instructions for instructing a computer device (which may be a personal computer, a server, a network device, or the like) to perform all or some of the steps of the methods described in the embodiments of this application. The storage medium includes any medium that can store the computer instructions, for example, a Universal Serial Bus (USB) flash drive, a removable hard disk, a ROM, a RAM, a magnetic disk, or a compact disc (CD).

What is claimed is:

1. A partition merging method implemented by a first database server in a distributed database system, wherein the method comprises:
   receiving, from a management server in the distributed database system, a merging instruction instructing to merge a first partition and a second partition into a third partition, wherein the distributed database system further comprises a second database server, wherein the first database server runs the first partition, and wherein the second database server runs the second partition;
   obtaining first metadata of the first partition;
   obtaining second metadata of the second partition;
   merging the first metadata and the second metadata to generate third metadata of the third partition; and
   accessing, based on the third metadata, data of the first partition and the second partition, wherein the first metadata further comprises a first write-ahead logging (WAL) information set of the first partition, wherein the second metadata further comprises a second WAL information set of the second partition, wherein the method further comprises determining, based on the first and second WAL information sets, to merge the first WAL information set and the second WAL information set to generate a third WAL information set of the third partition, and wherein the third WAL information set comprises first WAL information in the first WAL information set and second WAL information in the second WAL information set.

2. The method of claim 1, wherein the first partition and the second partition are adjacent partitions.

3. The method of claim 1, wherein the first metadata comprises first data storage unit information of a secondary column family of the first partition, wherein the second metadata comprises second data storage unit information of a secondary column family of the second partition, and wherein merging the first metadata and the second metadata to generate the third metadata comprises:
   merging the first data storage unit information and the second data storage unit information to generate target data storage unit information of a target secondary column family; and
   determining third data storage unit information of a secondary column family of the third partition based on the target data storage unit information.

4. The method of claim 3, wherein the first data storage unit information comprises $P_1$ levels of the first data storage unit information, wherein $P_1$ is a positive integer greater than or equal to 2, wherein the second data storage unit information comprises $P_2$ levels of the second data storage unit information, wherein $P_2$ is a positive integer greater than or equal to 2, wherein the target data storage unit information comprises Q levels of the target data storage unit information comprising the first data storage unit information and the second data storage unit information, wherein a first level of the target data storage unit information in the Q levels of the target data storage unit information comprises a second level of the first data storage unit information in the $P_1$ levels of the first data storage unit information and a third level of the second data storage unit information in the $P_2$ levels of the second data storage unit information, wherein a fourth level of the target data storage unit information in (Q−1) levels of the target data storage unit information in the Q levels of the target data storage unit information comprises a fifth level of the first data storage unit information in the $P_1$ levels of the first data storage unit information or a sixth level of the second data storage unit information in the $P_2$ levels of the second data storage unit information, and wherein Q is equal to $P_1+P_2-1$.

5. The method of claim 4, wherein first level 0 of the target data storage unit information in the Q levels of the target data storage unit information comprises second level 0 of the first data storage unit information in the first data storage unit information and third level 0 of the second data storage unit information in the second data storage unit information, wherein level (2×q−1) of the target data storage unit information in the Q levels of the target data storage unit information comprises first level q of the first data storage unit information in first P levels of the first data storage unit information in the $P_1$ levels of the first data storage unit information, wherein level (2×q) of the target data storage unit information in the Q levels of the target data storage unit information comprises second level q of the second data storage unit information in second P levels of the second data storage unit information in the $P_2$ levels of the second data storage unit information, wherein q=1, . . . , P−1, and wherein the method further comprises obtaining a value of P by subtracting 1 from a minimum value in $P_1$ and $P_2$.

6. The method of claim 4, wherein first level 0 of the target data storage unit information in the Q levels of the target data storage unit information comprises second level 0 of the first data storage unit information in the first data storage unit information and third level 0 of the second data storage unit information in the second data storage unit information, wherein first level 1 of the target data storage unit information to first level (P−1) of the target data storage unit information in the Q levels of the target data storage unit information are second level 1 of the first data storage unit information to second level (P−1) of the first data storage unit information in first P levels of the first data storage unit information in the $P_1$ levels of the first data storage unit information, wherein level P of the target data storage unit information to level (Q−1) of the target data storage unit information in the Q levels of the target data storage unit information are third level 1 of the second data storage unit information to third level (P−1) of the second data storage unit information in second P levels of the second data storage unit information in the $P_2$ levels of the second data storage unit information, wherein the method further comprises obtaining a value of P by subtracting 1 from a minimum value in $P_1$ and $P_2$.

7. The method of claim 3, wherein a prefix of an entry key value in each piece of the first data storage unit information, the second data storage unit information, the target data storage unit information, and the target data storage unit information is a non-partition key value, the method further comprising using by at least one of the management sever, first database server, or second database server the non-partition key value to query data.

8. The method of claim 1, wherein the first metadata further comprises first data storage unit information of a primary column family of the first partition, wherein the second metadata further comprises second data storage unit information of a primary column family of the second partition, wherein the method further comprises merging the first data storage unit information and the second data storage unit information to generate third data storage unit information of a primary column family of the third partition.

9. The method of claim 8, wherein a prefix of an entry key value in each piece of the first data storage unit information, the second data storage unit information, and the third data storage unit information is a partition key value, and wherein the method further comprises using the partition key value to determine on which partition data is located.

10. A first database server comprising:
a communications interface configured to receive, from a management server, a merging instruction instructing to merge a first partition and a second partition into a third partition, wherein the first partition runs on the first database server, and wherein the second partition runs on a second database server; and
a processor coupled to the communications interface and configured to:
obtain first metadata of the first partition;
obtain second metadata of the second partition;
merge the first metadata and the second metadata to generate third metadata of the third partition;
access data of the first partition and the second partition based on the third metadata, wherein the first metadata further comprises a first write-ahead logging (WAL) information set of the first partition, wherein the second metadata further comprises a second WAL information set of the second partition, wherein the method further comprises determining, based on the first and second WAL information sets, to merge the first WAL information set and the second WAL information set to generate a third WAL information set of the third partition, and wherein the third WAL information set comprises first WAL information in the first WAL information set and second WAL information in the second WAL information set.

11. The first database server of claim 10, wherein the first partition and the second partition are adjacent partitions.

12. The first database server of claim 10, wherein the first metadata comprises first data storage unit information of a secondary column family of the first partition, wherein the second metadata comprises second data storage unit information of a secondary column family of the second partition, and wherein the processor is further configured to:
merge the first data storage unit information and the second data storage unit information to generate target data storage unit information of a target secondary column family; and
determine third data storage unit information of a secondary column family of the third partition based on the target data storage unit information.

13. The first database server of claim 12, wherein the first data storage unit information comprises $P_1$ levels of the first data storage unit information, wherein $P_1$ is a positive integer greater than or equal to 2, wherein the second data storage unit information comprises $P_2$ levels of the second data storage unit information, wherein $P_2$ is a positive integer greater than or equal to 2, wherein the target data storage unit information comprises Q levels of the target data storage unit information comprising the first data storage unit information and the second data storage unit information, wherein a first level of the target data storage unit information in the Q levels of the target data storage unit information comprises a second level of the first data storage unit information in the $P_1$ levels of the first data storage unit information and a third level of the second data storage unit information in the $P_2$ levels of the second data storage unit information, wherein a fourth level of the target data storage unit information in (Q−1) levels of the target data storage unit information in the Q levels of the target data storage unit information comprises a fifth level of the first data storage unit information in the $P_1$ levels of the first data storage unit information or a sixth level of the second data storage unit information in the $P_2$ levels of the second data storage unit information, and wherein Q is equal to $P_1+P_2-1$.

14. The first database server of claim 13, wherein first level 0 of the target data storage unit information in the Q levels of the target data storage unit information comprises second level 0 of the first data storage unit information in the first data storage unit information and third level 0 of the second data storage unit information in the second data storage unit information, wherein level (2×q−1) of the target data storage unit information in the Q levels of the target data storage unit information comprises first level q of the first data storage unit information in first P levels of the first data storage unit information in the $P_1$ levels of the first data storage unit information, wherein level (2×q) of the target data storage unit information in the Q levels of the target data storage unit information comprises second level q of the second data storage unit information in second P levels of the second data storage unit information in the $P_2$ levels of the second data storage unit information, wherein q=1, . . . , P−1, and wherein the processor is further configured to obtain a value of P by subtracting 1 from a minimum value in $P_1$ and $P_2$.

15. The first database server of claim 13, wherein first level 0 of the target data storage unit information in the Q levels of the target data storage unit information comprises second level 0 of the first data storage unit information in the first data storage unit information and third level 0 of the second data storage unit information in the second data storage unit information, wherein first level 1 of the target data storage unit information to first level (P−1) of the target data storage unit information in the Q levels of the target data storage unit information are second level 1 of the first data storage unit information to second level (P−1) of the first data storage unit information in first P levels of the first data storage unit information in the $P_1$ levels of the first data storage unit information, wherein level P of the target data storage unit information to level (Q−1) of the target data storage unit information in the Q levels of the target data storage unit information are third level 1 of the second data storage unit information to third level (P−1) of the second data storage unit information in second P levels of the second data storage unit information in the $P_2$ levels of the second data storage unit information, wherein the processor is further configured to obtain a value of P by subtracting 1 from a minimum value in $P_1$ and $P_2$.

16. The first database server of claim 12, wherein a prefix of an entry key value in each piece of the first data storage unit information, the second data storage unit information, the target data storage unit information, and the target data storage unit information is a non-partition key value, and wherein the processor is further configured to use the non-partition key value to query data.

17. The first database server of claim 10, wherein the first metadata comprises first data storage unit information of a primary column family of the first partition, wherein the second metadata further comprises second data storage unit information of a primary column family of the second partition, wherein the processor is further configured to merge the first data storage unit information and the second data storage unit information to generate third data storage unit information of a primary column family of the third partition.

18. The first database server of claim 17, wherein a prefix of an entry key value in each piece of the first data storage unit information, the second data storage unit information, and the third data storage unit information is a partition key value, and wherein the processor is further configured to use the partition key value to determine on which partition data is located.

* * * * *